US006393538B2

(12) United States Patent
Murayama

(10) Patent No.: US 6,393,538 B2
(45) Date of Patent: May 21, 2002

(54) REPRODUCING UPDATES IN A FIRST FILE STORAGE UNIT TO A SECOND FILE STORAGE UNIT BY TRANSFERRING UPDATE INFORMATION FROM THE FIRST UNIT TO THE SECOND UNIT

(75) Inventor: Takashi Murayama, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/768,057

(22) Filed: Jan. 24, 2001

Related U.S. Application Data

(63) Continuation of application No. PCT/JP99/00701, filed on Feb. 18, 1999.

(30) Foreign Application Priority Data

Sep. 18, 1998 (JP) .......................................... 10-264258

(51) Int. Cl.[7] .............................................. G06F 12/16
(52) U.S. Cl. ...................... 711/162; 711/113; 707/204; 714/6
(58) Field of Search ............................ 711/162, 4, 111, 711/112, 113, 114, 118; 707/204; 714/6

(56) References Cited

U.S. PATENT DOCUMENTS

| 4,905,196 A | * | 2/1990 | Kirrmann ..................... 365/200 |
| 5,522,037 A | * | 5/1996 | Kitagawa et al. ............... 714/40 |
| 5,574,950 A | * | 11/1996 | Hathorn et al. ................. 710/8 |
| 5,742,792 A | * | 4/1998 | Yanai et al. ................... 711/162 |
| 5,751,997 A | * | 5/1998 | Kullick et al. ................ 711/162 |
| 5,845,328 A |  | 12/1998 | Maya et al. |
| 5,960,216 A | * | 9/1999 | Vishlitzky et al. ............. 710/74 |
| 6,023,584 A | * | 2/2000 | Barton et al. .................. 717/11 |

FOREIGN PATENT DOCUMENTS

| JP | SHO 55-034756 | 3/1980 | ........... G06F/13/04 |
| JP | Sho 58-144960 | 8/1983 | ........... G06F/13/04 |
| JP | Hei 06-59958 | 3/1994 | ........... G06F/12/00 |
| JP | Hei 09-171441 | 6/1997 | ............ G96F/3/06 |
| JP | Hei 09-190292 | 7/1997 | ............ G06F/3/06 |

* cited by examiner

*Primary Examiner*—Hong Kim
(74) *Attorney, Agent, or Firm*—Staas & Halsey LLP

(57) ABSTRACT

In order to realize duplicating of data even if a host apparatus, for example, modifies a part of commands to simplify a recovery process in the recovery process, a primary file unit issues a command similar to a writing operation directive command to a secondary file unit when accepting the write operation directive command from the host apparatus, directs to start the writing, and transfers writing start location information. Each time the primary file unit receives one of a series of write commands from the host apparatus after the writing operation directive command, the primary file unit issues a command similar to the write command to the secondary file unit to direct the writing, and transfers the data. When the write data is normally written in the secondary file unit, the primary file unit notifies the host apparatus of normal termination.

7 Claims, 15 Drawing Sheets

REPRODUCING UPDATES IN A FIRST FILE STORAGE UNIT TO A SECOND FILE STORAGE UNIT BY TRANSFERRING UPDATE INFORMATION FROM THE FIRST UNIT TO THE SECOND UNIT

This application is a cont of PCT/JP99/00701 filed Feb. 18, 1999.

TECHNICAL FIELD

There is a case where when a storage medium (primary site) that is the main becomes unusable in a file system handling user data due to, for example, occurrence of disaster, it is required to promptly switch it to another system to resume the operation without losing the user data written in the primary site up to the time of the occurrence of disaster. In order to duplicate data of a primary file unit to prevent the loss of the data, it is necessary to prepare a secondary file unit, and update data in the two file units in any technique when the data is updated.

The present invention relates to a remote transfer method for transferring update data (write data) from the primary file unit to the secondary file unit, when a host apparatus performs data-update (writing) in the primary file unit, so as to perform data-update in the secondary file unit which is same as the data-update performed in the primary file unit.

BACKGROUND ART

There are generally two techniques for duplicating data.

One is that a host apparatus 1 simultaneously performs writing in two file units 2A and 2B to realize duplicating of data, as shown in FIG. 8. In such technique, it is possible to ensure equivalence of the data in the two file units 2A and 2B.

The other is a technique in which file units (FCUs) 2C and 2D are communicably connected, and when the host apparatus 1 updates (writes) data in one file unit (primary file unit) 2C, the update data (write data) is transferred from the primary file unit 2C to the secondary file unit 2D, thereby to realize duplicating of the data, as shown in FIG. 9. In this technique, it is possible to ensure equivalence of the data in the two file units 2C and 2D, as well.

Incidentally, data transfer from the primary file unit 2C to the secondary file unit 2D as above is called remote transfer. The file unit is sometimes called a file control unit (FCU: File Control Unit).

In the former technique, the host apparatus 1 simultaneously writes in the two file units 2A and 2B, so that the file units 2A and 2B can realize duplicating of the data without performing any special process. On the other hand, in the latter manner, the primary file unit 2C transfers data to the secondary file unit 2D, whereby the host apparatus 1 can realize duplicating of the data only by performing usual data-writing, being conscious of only one storage apparatus (primary file unit 2C), without performing any special process.

In the host apparatus 1, processes for its primary operations are performed, which is naturally a large load thereon. When the host apparatus 1 performs writing data into the secondary file unit 2D in the former technique, a further load is applied to the host apparatus 1, which is undesirable. Namely, in the former technique, since the host apparatus 1 simultaneously performs writing data into the two file units 2A and 2B, the host apparatus 1 is required to operate while being always conscious of duplicating of the data, and to perform a special interface process or the like.

For this reason, the latter technique is employed in these years. Wherein, it is general that the host apparatus 1 performs updating data in only the primary file unit 2C, assigning the primary file unit 2C to transfer the data to the secondary file unit 2D to duplicate the data. In this case, the host apparatus 1 is not required to perform any special process for duplicating the data, but required to perform only usual data-update in one file unit 2C. The primary file unit 2C therefore functions as an upper apparatus of the secondary file unit 2D to transfer/update the data to/in the secondary file unit 2D, whereby the data is duplicated.

Detailed structures of the system, and the files units 2C and 2D used in the system applied the latter technique will be described next with reference to FIG. 10.

As shown in FIG. 10, the primary file unit 1C and the secondary file unit 2D have the same structure, each of which comprises a CA (Channel Adapter) 11, an RM (Resource Manager) 12, a TS (Table Storage) 13, an RA (Remote Adapter) 14, a CFR (Cache Function Engine) 15, a cache memory 16, a DA (Device Adapter) 17, a command bus 18, a data bus 19, and a physical device 20.

The CA 11 is a module in charge of an interface control with the host apparatus 1 via an interface 21. The RM 12 is a module in charge of resource management with respect to a basic operation. The TS 13 is a memory used as a table for the resource management.

The RA 14 is a module in charge of transmission/reception of data to/from the file unit 2C or 2D via an interface 22. The CFE 15 is a module in charge of management of the cache memory 16. The DA 17 is a module in charge of an interface control with the physical device 20 that is a magnetic disk apparatus 20a. Incidentally, the cache memory 16 is provided with an inter-module communication area 16a. The communication area 16a is served to temporarily store data that is to be transmitted/received among the modules 11, 14 and 17 of each of the file units 2C and 2D.

The command bus 18 is served to exchange commands among the CA 11, the RM 12, the RA 14, the CFE 15 and the DA 17. The data bus 19 is served to exchange data among the CA 11, the RA 14, the CFE 15, the cache memory 16 and the DA 17.

FIG. 10 depicts a case where the host apparatus 1 has two channels 1a, and each of the file units 2C and 2D has two CAs 11, two RAs 14, four DAs 17, and four magnetic disk apparatuses 20a as the physical device 20.

The primary file unit 2C is connected to the host apparatus 1 via the interface 21, while the secondary file unit 2D is connected to the primary file unit 2C via the interface 22. The interface 21 connects the channel 1a of the host apparatus 1 to the CA 11 of the primary file unit 2C. The interface 22 connects the RA 14 of the primary file unit 2C to the RA 14 of the secondary file unit 2D.

As these interfaces 21 and 11, same device, that is, ESCON interface, for example, are used. The primary unit 2C has a function enabling an access from the RA 14 thereof t the RA 14 of the secondary file unit 2D in the similar sequence to that to the channel. In other words, the RA 14 of the primary file unit 2C is such configured as to be able to issue a command to the RA 14 of the secondary file unit 2D in the similar sequence to that performed between the channel of the host apparatus 1 and the CA 11 of the primary file unit 2C.

Incidentally, hardware of the CA 11 and hardware of the RA 14 are basically the same. The RA 14 of the primary file unit 2C operates equivalent to the channel, as described above. Therefore, it is unnecessary to provide, as the RA 14 of the secondary file unit 2D, an adapter having a special function, because an adapter having a function as the CA 11 connected to the ordinary channel 1a is sufficient.

When the host apparatus 1 writes data into the primary file unit 2C, the data is transferred in units of record to the primary file unit 2C, and temporarily written into the cache memory 16. When data for one track of the magnetic disk apparatus 20a, which is an object to be written, is written into the cache memory 16 of the primary file unit 2C, remote transfer to the secondary file unit 2D is carried out, then data-writing to the magnetic disk apparatus 20a of the primary file unit 2C is carried out.

FIG. 11 is a diagram showing an example of structure of data for one track to be temporarily written in the cache memory 16 of the primary file unit 2C in order to transfer the data to the secondary file unit 2D and write the same into the physical device 20. As shown in FIG. 11, the data for one track sent to the secondary file unit 2D is made up of a control information field on the head end and a plurality (N in FIG. 11) of record fields.

In the primary file unit 2C having received one write command from the host apparatus 1, one record field is written into the cache memory 16, and at the same time control information in the control information field on the head end is constantly updated. When a plurality of commands configuring one CCW (Channel Command Word) are continuously sent from the host apparatus 1 to the primary file unit 2C, the control information is updated each time the command is accepted. Whereby, control information necessary for transferring/writing such as the number of records involved in transfer data for one track is created, and written into the control information field. Incidentally, plural commands are combined to form one CCW, which is a unit to have a series of device accesses.

Remote transfer from the primary file unit 2C to the secondary file unit 2D or data-writing from the cache memory 16 to the physical device 20 is heretofore always performed in units of track. As stated above, control information about more than one record forming the same track is stored in one piece of control information. When the host apparatus 1 completes all write processes on the relevant track, control information on that track is established. Accordingly, data for one track is written into the cache memory 16 by a plurality of write commands from the host apparatus 1 to complete that track. The data of that track is then sent from the primary file unit 2C to the secondary file unit 2D, and written into the physical device 20 of the primary file unit 2C.

Next, a procedure of the remote transfer performed by the system configured as above (refer to FIG. 10) will be described with reference to FIG. 12. FIG. 12 is a sequence diagram for illustrating a series of flows of the remote transfer from the primary file unit 2C to the secondary file unit 2D accompanying data-writing from the host apparatus 1 to the primary file unit 2C. In the following description and FIG. 12, the RA in the primary file unit 2C is denoted as RA(P) while the RA in the secondary file unit 2D is denoted as RA(S) In FIG. 12, the channel 1a is denoted as CH.

In the example shown in FIG. 12, n write commands CCW1 to CCWn are transmitted from the channel 1a of the host apparatus 1 in order to write data for one track into the primary file unit 2C. Incidentally, one CCW is made up of the n write commands CCW1 to CCWn.

The first write command CCW1 is transmitted from the channel 1a to the CA 11 (refer to an arrow A11). When accepting CCW1, the CA 11 notifies the channel 1a of acceptance of the write command CCW1 (refer to an arrow A12). The host apparatus 1 having received the notification transmits write data to the CA 11 (refer to an arrow A13). The CA 11 writes the data received from the channel 1a in the cache memory 16 (refer to an arrow A14), then notifies the channel 1a of normal termination (refer to an arrow A15).

In the similar manner, when the CA 11 completes writing of data in the cache memory 16 by a write command CCWn (refer to arrows A15 to A24), the CA 11 writes information relating to the command now being processed into the communication area 16a of the cache memory 16 in order to notify the RA(P) 14 of the information (refer to an arrow A25).

After that, the CA 11 issues a request for assignment of the RA(P) 14 to be used for the remote transfer to the RM 12 (refer to arrows A26 and A27) The RA(P) 14 assigned by the RM 12 refers to information in the communication area 16a of the cache memory 16 (refer to an arrow A28), issues a command CCWx for inter-RA only different from the above commands CCW1 to CCWn to the RA(S) 14 (refer to an arrow A29), thereby to establish communication between the RA(P) 14 and the RA(S) 14.

When the communication is established, the RA(S) 14 notifies the RA(P) 14 of acceptance of the command CCWx (refer to an arrow A30). The RA(P) 14 having received the notification reads out predetermined data from the cache memory 16 by reading out the control information updated as above from the cache memory 16 (refer to an arrow A31), and transfers the predetermined data to the RA(S) 14 (refer to an arrow A32).

The RA(S) 14 writes data received from the RA(P) 14 into the cache memory 16, and notifies the RA(P) 14 of normal termination (refer to an arrow A33). The normal termination is notified the CA 11 from the RA(P) 14 via the communication area 16a (refer to an arrow A34). The CA 11 notifies the channel 1a that the processes on the series of commands CCW1 to CCWn have been normally terminated (refer to an arrow A35).

After these processes are terminated, the DA 17 writes the data held into the cache memory 16 in the physical device 20 in the primary file unit 2C, although not shown in FIG. 12. In the secondary file unit 2D, the DA 17 writes the data held in the cache memory 16 into the physical device 20, as well. Whereby, duplicating of the data in the primary file unit 2C and the secondary file unit 2D is accomplished.

Next description will be made of a recovery process performed by the host apparatus 1 when any fault occurs in the secondary file unit 2D after data transfer to the RA(S) 14 is initiated in the similar manner to FIG. 12, as shown by arrows A11 to A32 in FIG. 13. FIG. 13 is a sequence diagram for illustrating a series of flows of the recovery process performed by the host apparatus 1 when a fault occurs during the remote transfer from the primary file unit 2c to the secondary file unit 2D.

Incidentally, arrows in FIG. 13 denoted by the same reference characters in FIG. 12 show the same operations, description of which is thus omitted. In FIG. 13, arrows denoted by reference characters with a dash (') show operations accompanying the recovery process by the host apparatus 1. Namely, operations denoted by arrows A11' to A35' in FIG. 13 are a recovery operation for the operations denoted by the arrows A11 to A35 in FIG. 12.

As shown in FIG. 13, when any fault occurs in the secondary file unit 2D after data transfer to the PA(S) 14 is initiated, the RA(S) 14 notifies the RA(P) 14 of abnormal termination (refer to an arrow A36). This abnormal termination is notified the CA 11 from the RA(P) 14 via the communication area 16a (refer to an arrow A37). The CA 11 notifies the channel 1a of the abnormal termination of the processes by the series of commands CCW1 to CCWn (refer to an arrow A38).

The host apparatus 1 notified of the abnormal termination as above initiates the recovery process.

Generally, the host apparatus 1 performs the recovery process with respect to one CCW made up of the plural commands CCW1 to CCWn. For this, when a normal termination notification at the last command CCWn of that CCW is not sent back to the host apparatus 1, all the commands CCW1 to CCWn are not regarded as normal termination even if normal termination of each command is notified.

Accordingly, when the primary file unit 2C notifies the host apparatus 1 of occurrence of an error (that is, abnormal termination) due to any fault while the CCW is processed, the host apparatus 1 carries out the recovery process to reissue the CCW from the leading command CCW1 during which the error has occurred. Namely, the host apparatus 1 reissues the commands CCW1 to CCWn, so that processes similar to those shown in FIG. 12 are again performed between the host apparatus 1 and the primary file unit 2C, and between the primary file unit 2C and the secondary file unit 2D, as shown by the arrows A11' to A35' in FIG. 13.

The recovery process by the host apparatus 1 described above with reference to FIG. 13 will be further described with reference to FIG. 14. FIG. 14 is a sequence diagram simply showing concrete examples of a procedure of the known remote transfer and a procedure of the recovery process by the host apparatus 1 performed when a fault occurs. In FIG. 14, no reference character is given to arrows, and the procedure described above with reference to FIG. 13 is roughly depicted. Namely, only arrows indicating transfer of commands, notification of normal/abnormal termination and remote transfer are shown.

FIG. 14 shows an example in which the host apparatus 1 issues a CCW made up of five write commands A to E. The host apparatus 1 issues four write commands A to D to the primary file unit 2C. Each time data is written into the cache memory 16 of the primary file unit 2C by each of the write commands A to D, normal termination is notified the host apparatus 1 from the primary file unit 2C.

When data is written into the cache memory 16 of the primary file unit 2C by the fifth write command E and data for one track is thus completed, the remote transfer from the primary file unit 2C to the secondary file unit 2D is initiated. Normal terminal is not notified immediately after the data is written by the write command E, but information on normal/abnormal termination notified the primary unit 2C from the secondary file unit 2D after the remote transfer is notified the host apparatus 1 as information on normal/abnormal termination with respect to the write command E from the primary file unit 2C.

Therefore, when any fault occurs in the secondary file unit 2D after the remote transfer and abnormal termination is notified the primary file unit 2C from the secondary file unit 2D, the primary file unit 2C notifies the host apparatus 1 of the abnormal termination.

At this time, the host apparatus 1 can see only the primary file unit 2C, and cannot at all see the secondary file unit 2D. For this, the host apparatus 1 recognizes that the notification of abnormal termination received from the primary file unit 2C is caused by a fault in the primary file unit 2C although it caused by a fault in the secondary file unit 2D.

As stated above, the host apparatus 1 performs the recovery process for one CCW made up to of the five commands A to E. Therefore, when notified of abnormal termination of the last command E of the CCW, the host apparatus 1 considers that all the commands A to E of that CCW have been abnormally terminated even though the host apparatus 1 has notified of normal termination of the commands A to D, and reissues the CCA abnormally terminated from the leading command A.

FIG. 15 shows a concrete example of procedure (sequence diagram) of the known recovery process in the case where, since a fault or the like occurs in the primary file unit when the command E is issued from the host apparatus 1 to the primary file unit 2C, the primary file unit 2C notifies the host apparatus 1 of abnormal termination. Incidentally, FIG. 15 shows an example in which the host apparatus 1 issues a CCW made up of five write commands A to E at the level equivalent to FIG. 14, similarly to the example shown in FIG. 14.

As shown in FIG. 15, the host apparatus 1 performs the same recovery process regardless of whether a fault occurs in the primary file unit 2C or in the secondary file unit 2D. As a result, even if a fault occurs in the secondary file unit 2D as shown in FIG. 14, the host apparatus 1 recognizes that the fault occurs in the primary file unit 2C and performs the recovery process as shown in FIG. 15.

In the examples of the process shown in FIGS. 14 and 15, the data-writing by the commands A to D are normally terminated. It is therefore considered that issuing only the command E and writing the data by the command E only will suffice for the recovery process. However, it is necessary to create track data while successively updating the control information by the five commands A to E forming one CCW as described above with reference to FIG. 11, thus it is impossible to perform normal data-writing (creation of the track data) if only the command E is separately issued. Particularly, since the command A includes information on location in which the data is to be written, reissue of the command A is essential.

Consequently, it is impossible to perform only data-writing by the last command E in the known recovery process. It is thus required to reissue the commands normally terminated to rewrite the same data as shown in FIG. 14 or 15, therefore time is spent on the recovery process. Even if a fault occurs while the command C, for example, is processed and the command C is thus abnormally terminated in the procedure shown in FIG. 15 or 16, the recovery process is performed by reissuing the CCW from the leading command A.

It is alternatively considered that when the host apparatus 1 performs the recovery process for the primary file unit 2C as shown in FIG. 15, the host apparatus 1 modifies the commands to partly simplify the procedure of the recovery process. FIG. 16 is a sequence diagram showing an example in which the procedure of the recovery process is simplified. FIG. 16 shows an example in which the host apparatus 1 issues a CCW made up of five write commands A to E at the level equivalent to FIG. 14, similarly to the example shown in FIG. 14. Here is examined a case in which a fault or the like occurs in the primary file unit 2C when the host apparatus 1 issues the last command E to the primary file unit 2C, as shown in FIG. 16.

In this case, when the host apparatus 1 performs the recovery process, since the host apparatus 1 can recognize that the commands A to D have been normally terminated on the basis of notification of normal termination, the host apparatus 1 modifies the commands A to D to create a command A' that can involve information on location in which data is to be written and can create predetermined control information on the head end of the track. After the host apparatus 1 issues the command A' to the primary file unit 2C, the host apparatus 1 issues the command E to the primary file unit 2C. Namely, considering that the write commands A to D have been normally written into the primary file unit 2C, the host apparatus 1 creates a new CCW, which can resume the write process from the command E having been abnormally terminated due to occurrence of an error, with the two commands A' and E, and issues the new CCW.

Whereby, the recovery process can be carried out by issuing the two commands A' and E without reissuing all the five commands A to E, so that the track data is written by the commands A to E in predetermined locations in the physical device 20 in the secondary file unit 2D and the primary file unit 2C.

However, after the remote transfer is performed, if the recovery process coping with the occurrence of any fault in the secondary file unit 2D in the procedure shown in FIG. 16, the following problem will arise. FIG. 17 is a sequence diagram showing a concrete example in the case where the host apparatus 1 performs the recovery process in the procedure shown in FIG. 16 when a fault occurs in the known remote transfer. FIG. 17 shows an example in which the host apparatus 1 issues a CCW made up of five write commands A to E similarly to the example shown in FIG. 14 at the level equivalent to FIG. 14.

As shown in FIG. 17, when the host apparatus 1 performs the recovery process in the procedure shown in FIG. 16 because of a fault in the secondary file unit 2D after remote transfer, data directed by the commands A to D normally terminated is not remote-transferred to the secondary file unit 2D, thus track data remote-transferred to the secondary file unit 2D in the recovery process is data directed by a CCW made up of only two commands A' and E.

Accordingly, only data by the commands A' and E exists in the physical device 20 of the secondary file unit 2D, data by the commands A to D thus does not exists, while data by the commands A to E is stored in the physical device 20 of the primary file unit 2C. It is therefore impossible to duplicate the data in the error recovery, and to assure equivalence of the data in the primary file unit 2C and the secondary file unit 2D.

In the light of the above problem, an object of the present invention is to provide a remote transfer method between file units, which can realize duplicating of data even if the host apparatus modifies a part of commands in the recovery process to simplify the recovery process, thereby certainly assuring equivalence of the data in two file units.

DISCLOSURE OF INVENTION

In order to accomplish the above object, a remote transfer method according to this invention has features as follows: In a file system comprising a primary file unit connected to a host apparatus to be data-updated by the host apparatus, and a secondary file unit connected to the primary file unit to be data-updated by the primary file unit, when the host apparatus writes data into the primary file unit by issuing a writing operation directive command for transferring writing start location information to the primary file unit as data, and successively issuing a series of write commands, which configures one write access unit together with the write operation directive command, to the primary file unit one by one, a remote transfer method from the primary file unit to the secondary file unit for writing into the secondary file unit data which is same as data written into the primary file unit by the host apparatus, the remote transfer method comprising the steps of issuing a command similar to the writing operation directive command from the primary file unit to the secondary file unit, when the primary file unit receives the writing operation directive command from the host apparatus, to direct to start the writing, then transferring the writing start location information as data, issuing a command similar to the write command from the primary file unit to the secondary file unit, each time the primary file unit receives one of the series of write commands from the host apparatus after the writing operation directive command, to direct the writing, then transferring data to be written by the write command, and making the primary file unit notify the host apparatus that the writing by the write command has been normally terminated, when the primary file unit confirms that data written in the primary file unit by the write command has been normally written in the secondary file unit.

When a factor requiring to temporarily disconnect the primary file unit from the host apparatus appears in the primary file unit while the series of write commands are processed, a disconnect request is issued from the primary file unit to the host apparatus to temporarily disconnect the primary file unit from the host apparatus, a disconnect request is issued from the primary file unit to the secondary file unit to temporarily disconnect the primary file unit from the secondary file unit, the factor in the primary file unit is settled, and in response to a reconnect request from the primary file unit, the primary file unit is then reconnected to the host apparatus and the primary file unit is reconnected to the secondary file unit.

When a factor requiring to temporarily disconnect the secondary file unit from the primary file unit appears in the secondary file unit while the series of write commands are processed, a disconnect request is issued from the secondary file unit to the primary file unit to temporarily disconnect the secondary file unit from the primary file unit, a disconnect request is issued from the primary file unit having received the disconnect request to the host apparatus to temporarily disconnect the primary file unit from the host apparatus, the factor is settled in the secondary file unit, and in response to a reconnect request from the secondary file unit, the secondary file unit is then reconnected to the primary file unit, and the primary file unit is reconnected to the host apparatus.

When a factor requiring to temporarily disconnect the primary file unit from the host apparatus appears in the primary file unit, and at the same time, a factor requiring to temporarily disconnect the secondary file unit from the primary file unit appears in the secondary file unit, while the series of write commands are processed, a disconnect request from the primary file unit to the host apparatus is issued prior to a disconnect request from the secondary file unit to the primary file unit to temporarily disconnect the primary file unit from the host apparatus, a disconnect request is issued from the primary file unit to the secondary file unit to temporarily disconnect the primary file unit from the secondary file unit, the factor in the primary file unit is settled, and then, in response to a reconnect request from the primary file unit, the primary file unit is reconnected to the host apparatus and the primary file unit is reconnected to and the secondary file unit, a disconnect request is issued from the secondary file unit to the primary file unit to temporarily disconnect the secondary file unit from the primary file unit, a disconnect request is issued from the primary file unit having received the disconnect request to the host apparatus to temporarily disconnect the primary file unit from the host apparatus, the factor in the secondary file unit is settled, and then, in response to a reconnect request from the secondary file unit, the secondary file unit is reconnected to the primary file unit and the primary file unit is reconnected to the host apparatus.

Similarly, when a factor requiring to temporarily disconnect the primary file unit from the host apparatus appears in the primary file unit, and at the same time, a factor requiring to temporarily disconnect the secondary file unit from the primary file unit appears in the secondary file unit, while the series of write commands are processed, a disconnect request from the primary file unit to the host apparatus may be issued prior to a disconnect request from the secondary file unit to the primary file unit to temporarily disconnect the primary file unit from the host apparatus, a disconnect request may be issued from the primary file unit to the secondary file unit to temporarily disconnect the primary file unit from the secondary file unit, the factor in the primary file unit and the factor in the secondary file unit may be simultaneously settled, and in response to a reconnect request from the primary file unit, the primary file unit may be then reconnected to the host apparatus and the primary file unit may be reconnected to the secondary file unit.

Alternatively, when, each time one of the series of write commands is accepted, a command similar to the write command is issued from the primary file unit to the secondary file unit to direct the writing, and data to be written by the write command is transferred, a command similar to the write command may be issued from the primary file unit to the secondary file unit to simultaneously carry out a command accept process between the primary file unit and the secondary file unit and a data receive process of receiving data to be written by the write command from said host apparatus in the primary file unit, and the data may be transferred from the primary file unit to the secondary file unit as soon as receiving the data is completed.

Still alternatively, a process of transferring, from the host apparatus to the primary file unit, data of the first write command following the writing operation directive command, and an accept process that should be completed between the primary file unit and the secondary file unit until data transfer of the first write command from the primary file unit to the secondary file unit is initiated, may be carried out in parallel.

As stated above, the remote transfer method between file units can yield the following effects and advantages:

[1] When one write access unit (for example, CCW) made up of a writing operation directive command and a subsequent series of write commands is executed, remote transfer from the primary file unit to the secondary file unit is carried out for each command, whereby certainly dublicating write data for each command. Even when any fault occurs while the series of write commands are processed, data written by write commands issued before the fault occurs is certainly duplicated. When the host apparatus performs the recovery process in order to cope with the fault, even if the host apparatus modifies a part of the commands to simplify a recovery process and issues write commands after the fault occurs to carry out the recovery process, a trouble as before does not arise, and equivalence of data in the two file units is certainly assured.

[2] When a disconnect factor appears in the primary file unit, not only the primary file unit and the host apparatus, but also the primary file unit and the secondary file unit are temporarily disconnected until the factor is settled. Therefore, the secondary file unit and the host apparatus can carry out another process without waiting for settlement of the factor, which leads to efficient operations.

[3] When a disconnect factor appears in the secondary file unit, not only the secondary file unit and the primary file unit, but also the primary file unit and the host apparatus are temporarily disconnected until the factor is settled. Therefore, the primary file unit and the host apparatus can carry out another process without waiting for settlement of the factor, which leads to efficient operations.

[4] When disconnect factors simultaneously appear in the primary file unit and the secondary file unit, not only the primary file unit and the host apparatus, but also the primary file unit and the secondary file unit are temporarily disconnected, a disconnect factor in the primary file unit is preferentially settled, and then the disconnect factor in the secondary file unit is settled. Whereby, even when disconnect factors simultaneously appear in the primary file unit and the secondary file unit, it is possible to cope with the appearance of the factor.

[5] When disconnect factors simultaneously appear in the primary file unit and the secondary file unit, the disconnect factor in the primary file unit and the disconnect factor in the secondary file unit are simultaneously settled. It is thereby possible to diminish probability of occurrence of disconnect request from the secondary file unit side after the primary file unit is reconnected to the secondary file unit, and shorten a response time up to the time that normal termination (termination status) is notified the host apparatus.

[6] When remote transfer is carried out in response to a write command from the host apparatus, a data transfer process from the host apparatus to the primary file unit and a command accept process between the primary file unit and the secondary file unit are carried out in parallel. As soon as data reception is completed, the data is remote-transferred, increasing the speed of the remote transfer process.

[7] A process of transferring data of the first write command from the host apparatus to the primary file unit, and a process of acceptance to be completed between the primary file unit and the secondary file unit until the data transfer by the first write command is initiated are carried out in parallel, further increasing the speed of the remote transfer process.

BEST MODE FOR CARRYING OUT THE INVENTION

Hereinafter, description will be made of an embodiment of the present invention with reference to the drawings.

[A] Description of a Remote Transfer Method According to an Embodiment

Figure 10:
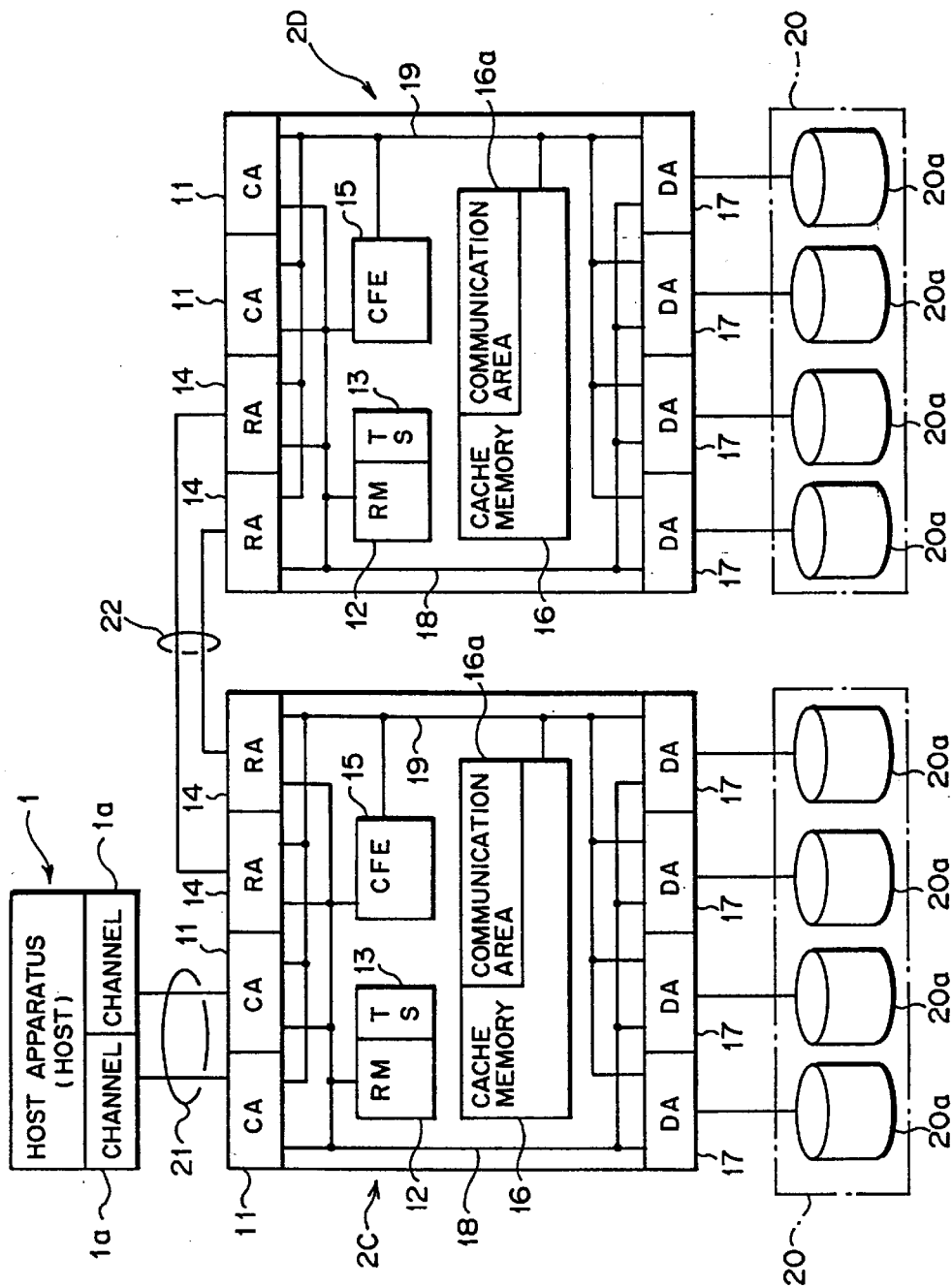
FIG. 10 is a block diagram showing a structure of a system to which the technique shown in FIG. 9 is applied and detailed structures of file units (FCU) used in the system.
Figure 11:
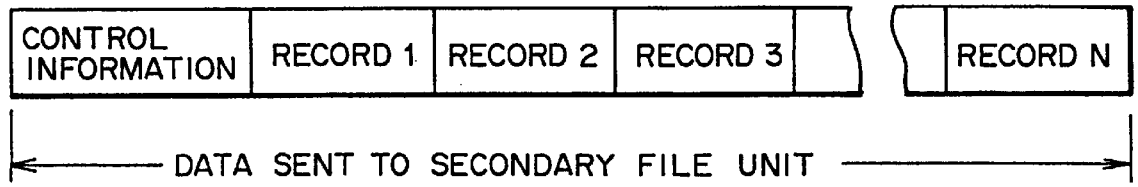
FIG. 11 is a diagram showing an example of structure of data for one track to be temporarily written into a cache memory of a primary file unit.
Figure 12:
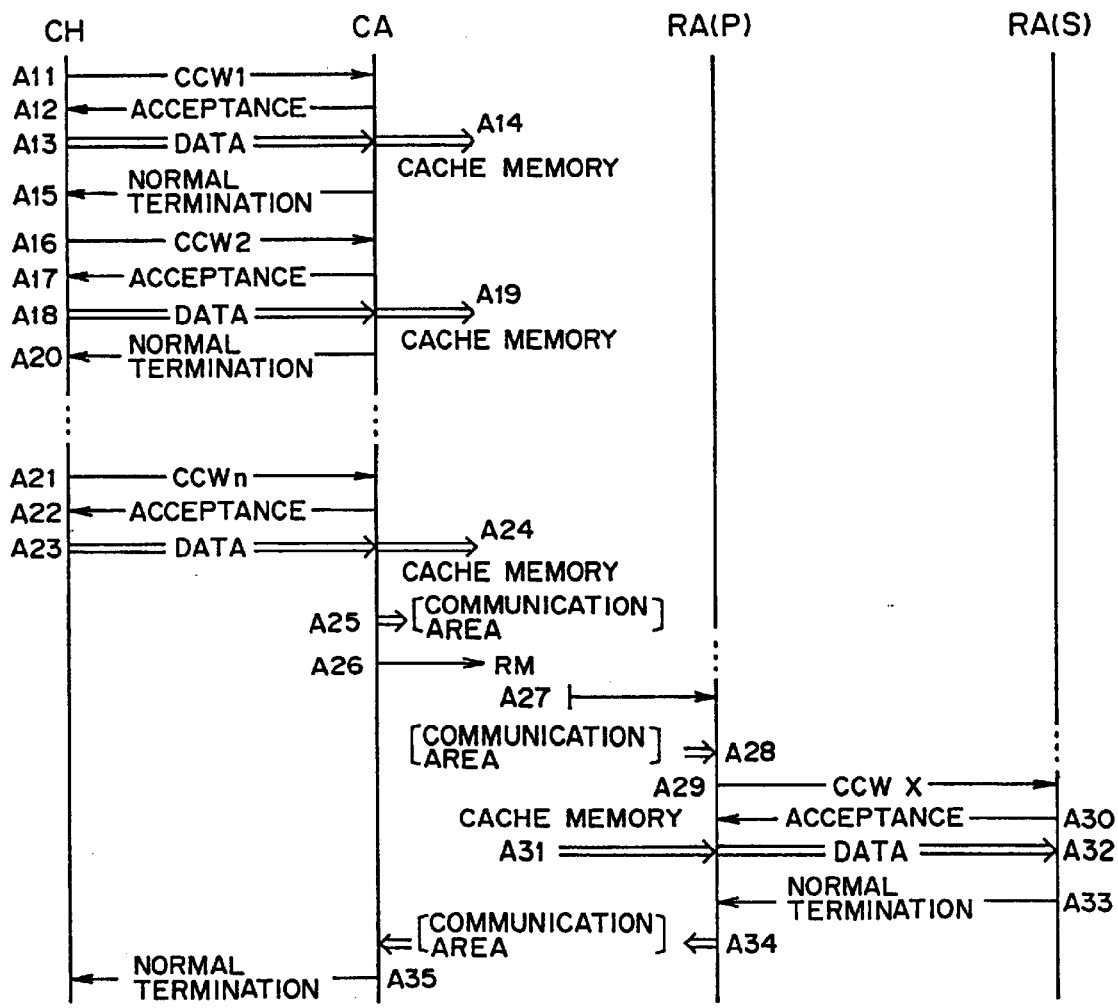
FIG. 12 is a sequence diagram for illustrating a known remote transfer procedure (at the time of normal termination) performed in the system shown in FIG. 10.
Figure 13:
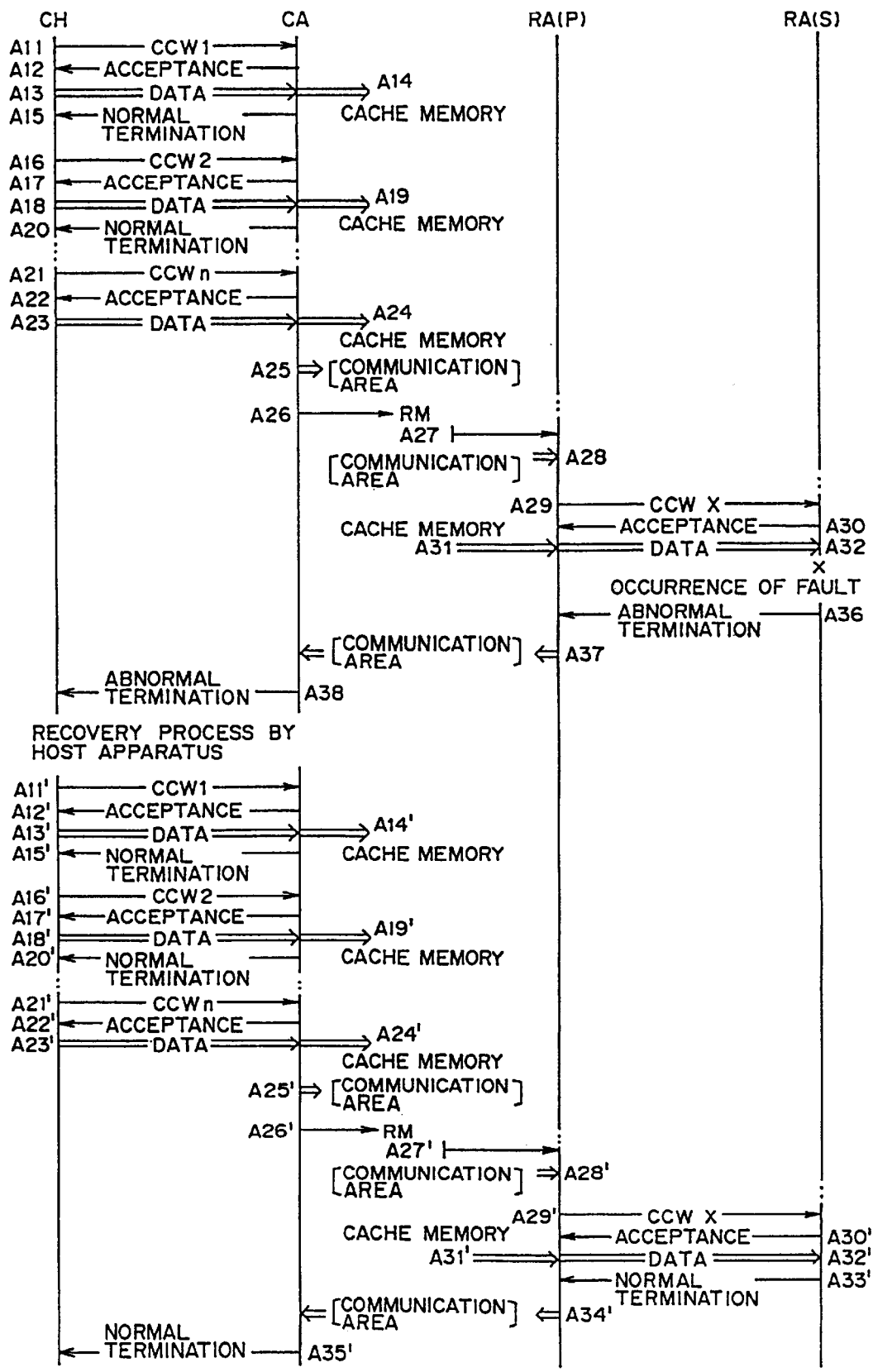
FIG. 13 is a sequence diagram for illustrating the known remote transfer procedure and recovery process procedure by a host apparatus at the time of occurrence of a fault performed in the system shown in FIG. 10.
Figure 14:
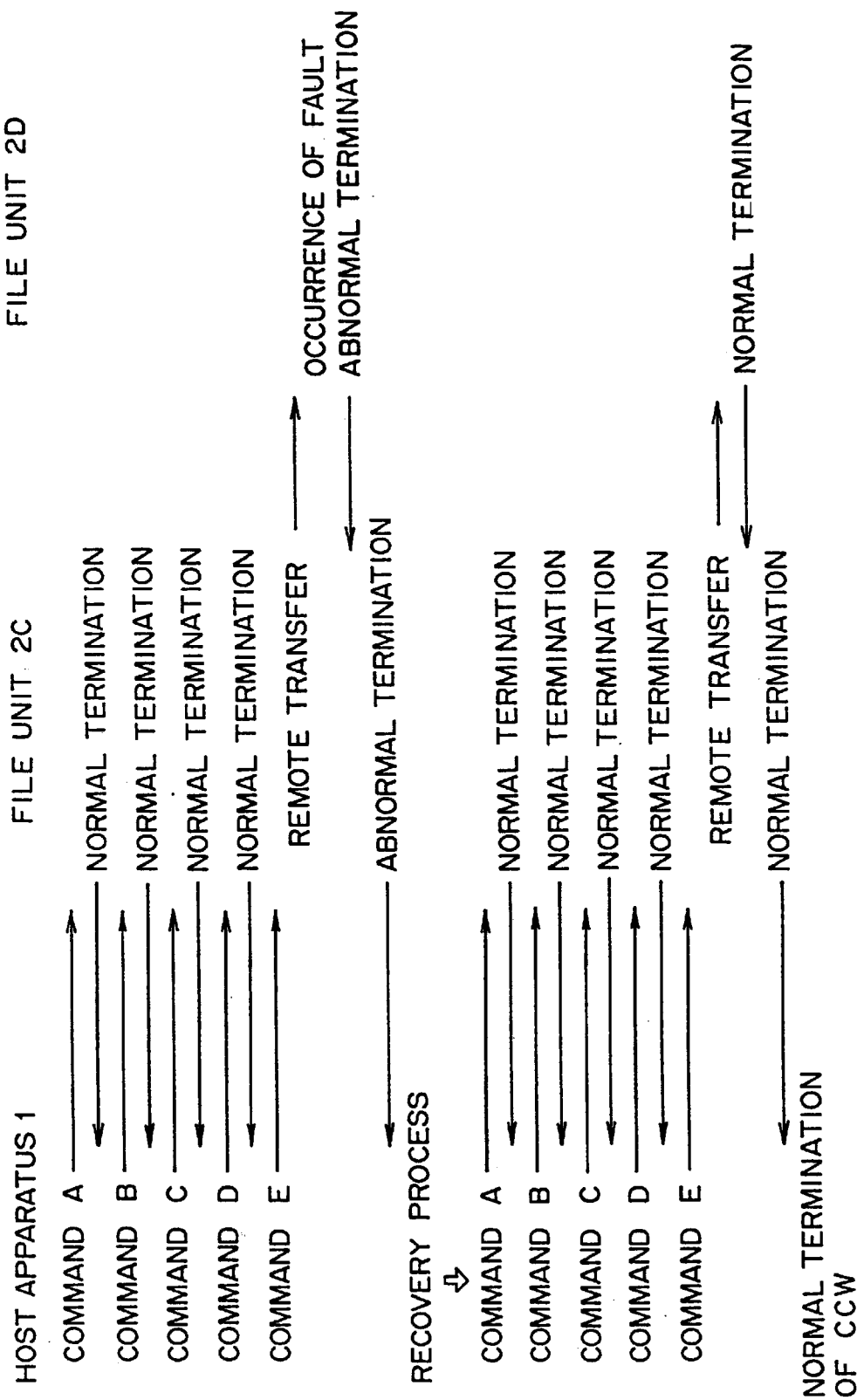
FIG. 14 is a sequence diagram simply showing a concrete example of the known remote transfer procedure and recovery process procedure by the host apparatus at the time of occurrence of a fault.
Figure 15:
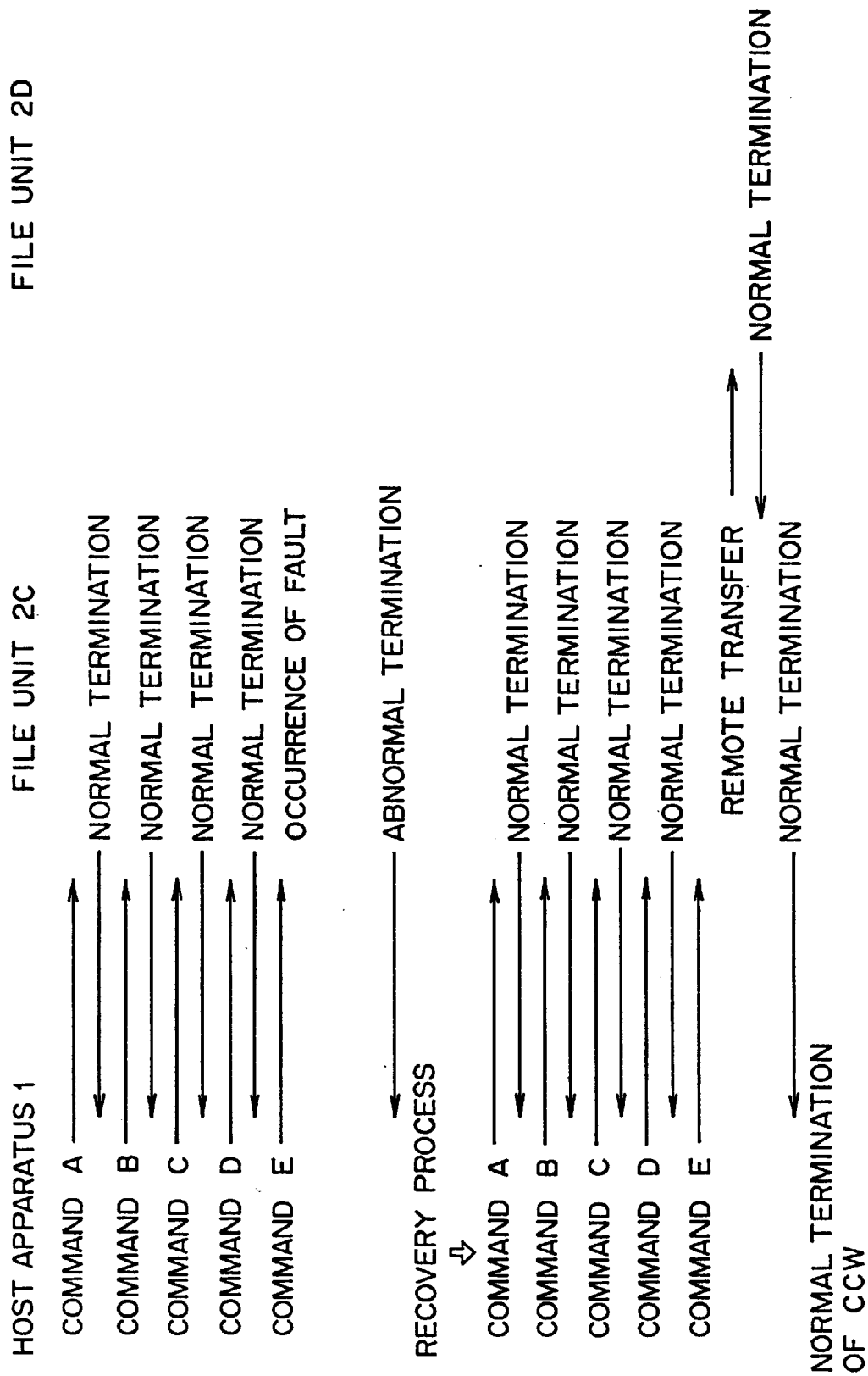
FIG. 15 is a sequence diagram showing a concrete example of the known recovery process procedure performed on the primary file unit by the host apparatus.

Since hardware such as a file system, file units (primary file unit 2C and secondary file unit 2D) and the like, to which a remote transfer method according to an embodiment of this invention is applied, is similar to that shown in FIG. 10, detailed description of the file system, the file units 2C and 2D is thus omitted.

The file system according to this embodiment is such configured as to assure equivalence of data, which is written from the host apparatus 1 (channel 1a), between the two file units 2C and 2D, and in the file system, the primary file unit 2C and the secondary file unit 2D are connected by the interface 22 which is of the same type as the interface 21 connecting the channel 1a to the primary file unit 2C, as described above with reference to FIG. 10.

As each of the interfaces 21 and 22, ESCON interface, for example, is used. The primary file unit 2C has a function being able to access to the secondary file unit 2D in the similar sequence to a sequence for accessing from the channel 1a to the primary file unit 2C. Namely, the RA(P) 14 can issue a command to the RA(S) 14 of the secondary file unit 2D in the similar processing method to the sequence performed between the channel 1a and the CA 11. As stated above, the RA(P) 14 performs operation equivalent to the channel 1a. Therefore, the RA(S) 14 is not required to have a special function, but needs to have a function as the CA 11 connected to the general channel 1a, as described above.

A characteristic procedure of remote transfer of this invention that will be described hereinafter is readily realized by slightly modifying software (program), used to realize the known remote transfer, described above with reference to FIGS. 12 through 15.

Next description will be made of a remote transfer method between file units according to the embodiment of this invention with reference to FIGS. 1 through 7.

Figure 1:
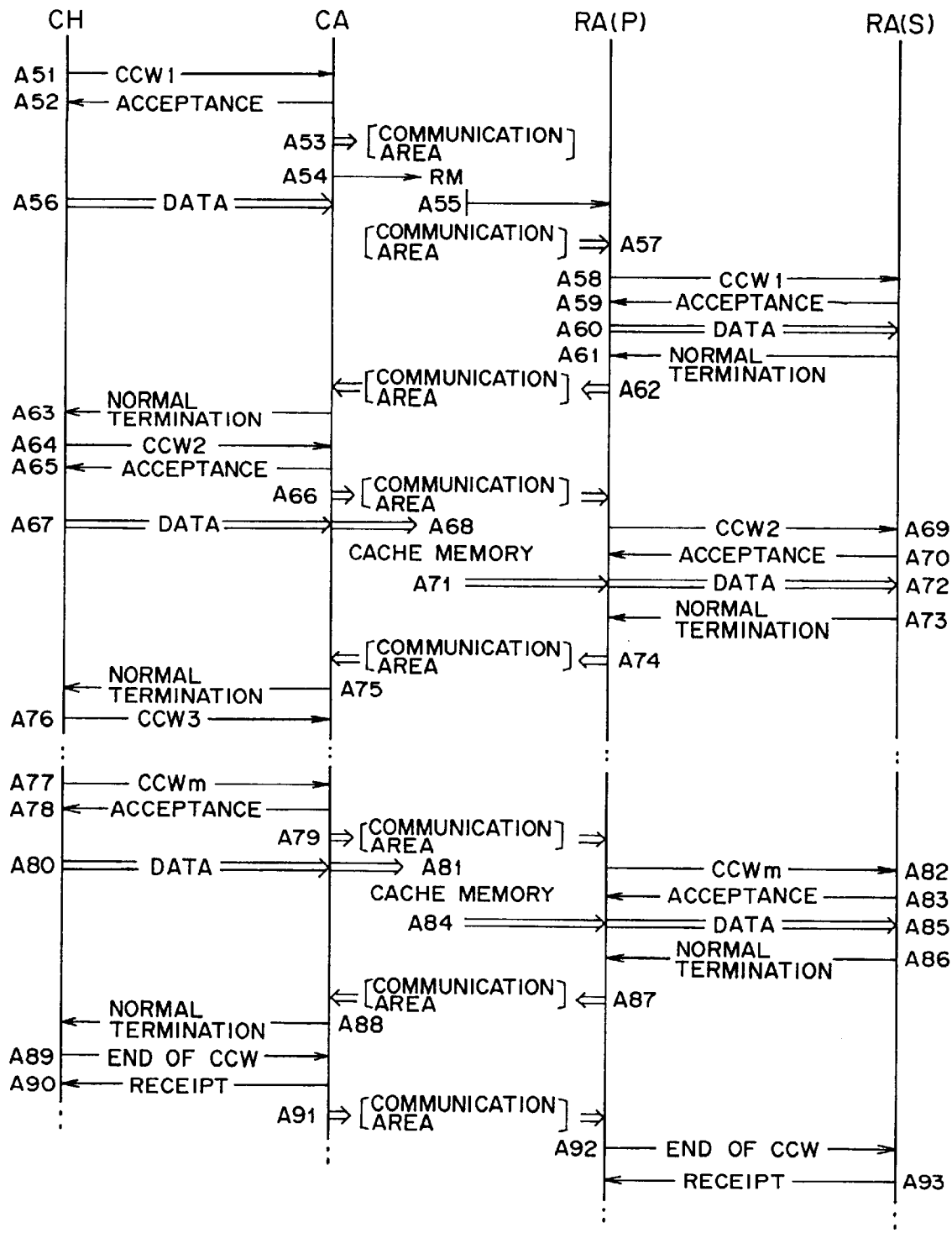
FIG. 1 is a sequence diagram for illustrating a procedure of a remote transfer method between file units according to an embodiment of this invention.

FIG. 1 is a sequence diagram for illustrating a procedure of the remote transfer method between the file units 2C and 2D according to the embodiment of this invention.

According to this embodiment, the host apparatus 1 writes data into the primary file unit 2C by issuing a writing operation directive command (Locate Record, Seek+Search ID, or the like) CCW1 for transferring writing start location information as data to the primary file unit 2C, and then successively issuing a series of write commands CCW2 to CCWm, which configures one write access unit (for example, CCW described above) together with the writing operation directive command CCW1, to the primary file unit 2C one by one. The remote transfer procedure (data duplicating technique) according to this embodiment in such case will be described next.

As shown in FIG. 1, when the CA 11 of the primary file unit 2C is directed a write operation by a command CCW1 from the channel 1a, that is, when the CA 11 accepts a writing operation directive command as the command CCW1 (refer to an arrow A51), the CA 11 notifies the channel 1a of acceptance of the command CCW1 (refer to an arrow A52) besides writing the command CCW1 into the communication area 16a (refer to an arrow A53) and directs the RM 12 to execute the command CCW1 (refer to an arrow A54). Namely, the CA 11 requests the RM 12 to appropriately assign the RA(P) 14 to secure the RA(P) 14 for performing a write process on the secondary file unit 2D after accepting a process by a write command to be performed.

In the CA 11, a directive of the write operation is discriminated by a parameter of "Locate Record" included in the command CCW1. Incidentally, "Locate Record" is one example of locate commands. It is alternatively possible to use another command, "Seek+Search ID" or the like.

The writing operation directive command CCW1 that is first sent is to locate the following write process. Data accompanying the command CCW1, that is, the writing start location information, is sent from the channel 1a to the CA 11 (refer to an arrow A56), and written into the communication area 16a.

The RA(P) 14 assigned by the RM 12 refers to the information in the communication area 16a (refer to an arrow A57), and issues the command CCW1 to the RA(S) 14 (refer to an arrow A58), thereby establishing communication between the RA(P) 14 and the RA(S) 14.

When the communication is established, the RA(S) 14 notifies the RA(P) 14 of acceptance of the command CCW1

(refer to an arrow A59). The RA(P) 14, having received the acceptance notification, transmits the writing start location information as data to the RA(S) 14 (refer to an arrow A60). When receiving the writing start location information, the RA(S) 14 notifies the RA(P) 14 of normal termination (refer to an arrow A61). The normal termination is notified the CA 11 via the communication area 16a from the RA(P) 14 (refer to an arrow A62). The CA 11 notifies the channel 1a that the process responsive to the command CCW 1 has been normally terminated (refer to an arrow A63).

Next, the host apparatus 1, having received the notification of normal termination of the command CCW1, sends the first write command CCW2 to the CA 11 of the primary file unit 2C from the channel 1a (refer to an arrow A64) When receiving the write command CCW2, the CA 11 notifies the channel 1a of acceptance of the write command CCW2 (refer to an arrow A65), besides directing the RA(P) 14 via the communication area 16a to execute the write command CCW2 (refer to an arrow A66). Data to be written by the write command CCW2 is transmitted from the channel 1a having received the acceptance notification to the CA 11 (refer to an arrow A67), and the data is written into the cache memory 16 (refer to an arrow A68).

The RA(P) 14, having received the directive to execute the write command CCW2, issues the write command CCW2 to the RA(S) 14 (refer to an arrow A69). When receiving the write command CCW2, the RA(S) 14 notifies the RA(P) 14 of acceptance of the write command CCW2 (refer to an arrow A70). The RA(P) 14, having received the acceptance notification, reads data to be written by the write command CCW2 from the cache memory 16 (refer to an arrow A71), and transmits the data to the RA(S) 14 (refer to an arrow A72). When receiving the data, the RA(S) 14 notifies the RA(P) 14 of normal termination (refer to an arrow A73). The normal termination is notified the CA 11 via the communication area 16a from the RA(P) 14 (refer to an arrow A74) The CA 11 notifies the channel 1a that the process by the write command CCW2 has been normally terminated (refer to an arrow A75).

In the similar manner, the host apparatus 1, having received the normal termination of the write command CCW2, successively transmits a series of the write commands CCW3 to CCWm one by one to the primary file unit 2C (refer to arrows A76 and A77). Each of the write commands CCW3 to CCWm is remote-transferred to the secondary file unit 2D in the similar procedure to that shown by the arrows A64 to A75, and data to be written by each of the write commands CCW3 to CCWm is remote-transferred to and written into the secondary file unit 2D. Incidentally, the arrows A77 to A89 showing a process according to the write command CCWm in FIG. 1 correspond to the arrows A64 to A75 showing the process according to the write command CCW2, respectively, description of which is thus omitted.

When one CCW is terminated, a command "end of CCW", notifying that this write access unit is terminated, is transmitted from the channel 1a to the CA 11 of the primary file unit 2C (refer to an arrow A89). When receiving the command "end of CCW", the CA 11 notifies the channel 1a that the command "end of CCW" is received (refer to an arrow A90), besides notifying the RA(P) 14 via the communication area 16a of end of the CCW (refer to an arrow A91). The RA(P) 14, having received the notification of end of CCW, issues a command "end of CCW" to the RA(S) 14 (refer to an arrow A92). When receiving the command "end of CCW", the RA(S) 14 notifies the RA(P) 14 that the command "end of CCW" is received (refer to an arrow A93)

After this process is terminated, the data held in the cache memory 16 is written into the physical device 20 by the DA 17 in the primary file unit 2C, while the data held in the cache memory 16 is written into the physical device 20 by the DA 17 in the secondary file unit 2D, although not shown in FIG. 1, whereby duplicating of the data is realized in the primary file unit 2C and the secondary file unit 2D.

According to the remote transfer method of this embodiment, whenever a process by a command similar to known one is completed in primary file unit 2C for each write command directed by the host apparatus 1 after the writing operation directive command CCW1, the CA 11 connected to the channel 1a notifies the RA(P) 14 of a write command processed this time using the inter-module communication area 16a and waits for a termination response of the remote transfer of the write command from the RA(P) 14 to the secondary file unit 2D, as described above. Meanwhile, as the similar command process to the known one in the primary file unit 2C, there is, for example, a process of writing data from the host apparatus 1 into the cache memory 16 to update the control information in the case of the write command.

Namely, the RA(P) 14 issues the similar write command to the secondary file unit 2D on the basis of information in the inter-module communication area 16a shown by the CA 11 now connecting to the channel 1a, reads control information in the cache memory 16 designated the relevant data, the control information being updated by the CA 11, to capture the control information into a buffer held by the RA(P) 14, sends the control information as data of the relevant write command, and accepts a termination status of the command from the RA(S) 14 of the secondary file unit 2D. The RA(S) 1 of the secondary file unit 2D performs the similar process to the procedure according to the write command received by the CA 11 from the channel 1a. The RA(E) 14 notifies the CA 11 now connecting to the channel 1a of the received termination status using the inter-module communication area 16a.

The CA 11 notified of completion of the command, operation in the secondary file unit 2D from the RA.(P) 14 sends back normal termination to the channel 1a of the host apparatus 1 as well when a command termination status thereof shows normal termination. When the command termination status shows abnormal termination, the CA 11 reports the channel 1a of the host apparatus 1 that its own write access has been abnormally terminated. As this, complete duplicating is always assured for each write command of data in the primary file unit 2C and the secondary file unit 2D.

According to the remote transfer method of the embodiment of this invention, when a command (Locate Record, Seek+Search ID, or the like), by which a writing operation is performed, is directed from the host apparatus 1 in order to have an access to the physical device 20 from the host apparatus 1, the RA(P) 14 of the primary file unit 2C becomes an upper apparatus of the secondary file unit 2D, and issues a command thereto. Each command operation directed to the primary file unit 2C from the channel 1a via the CA 11 is similarly directed to the secondary file unit 2D from the primary file unit 2C. Data written into the primary file unit 2C by one write command issued from the host apparatus 1 is transferred to the secondary file unit 2D from the primary file unit 2C by the similar write command, and after the primary file unit 2C confirms that the data has been normally written, the primary file unit 2C returns a termination status of the command operation to the channel 1a, whereby equivalence of the data in the two file units 2C and 2D is assured for each write command.

Figure 16:
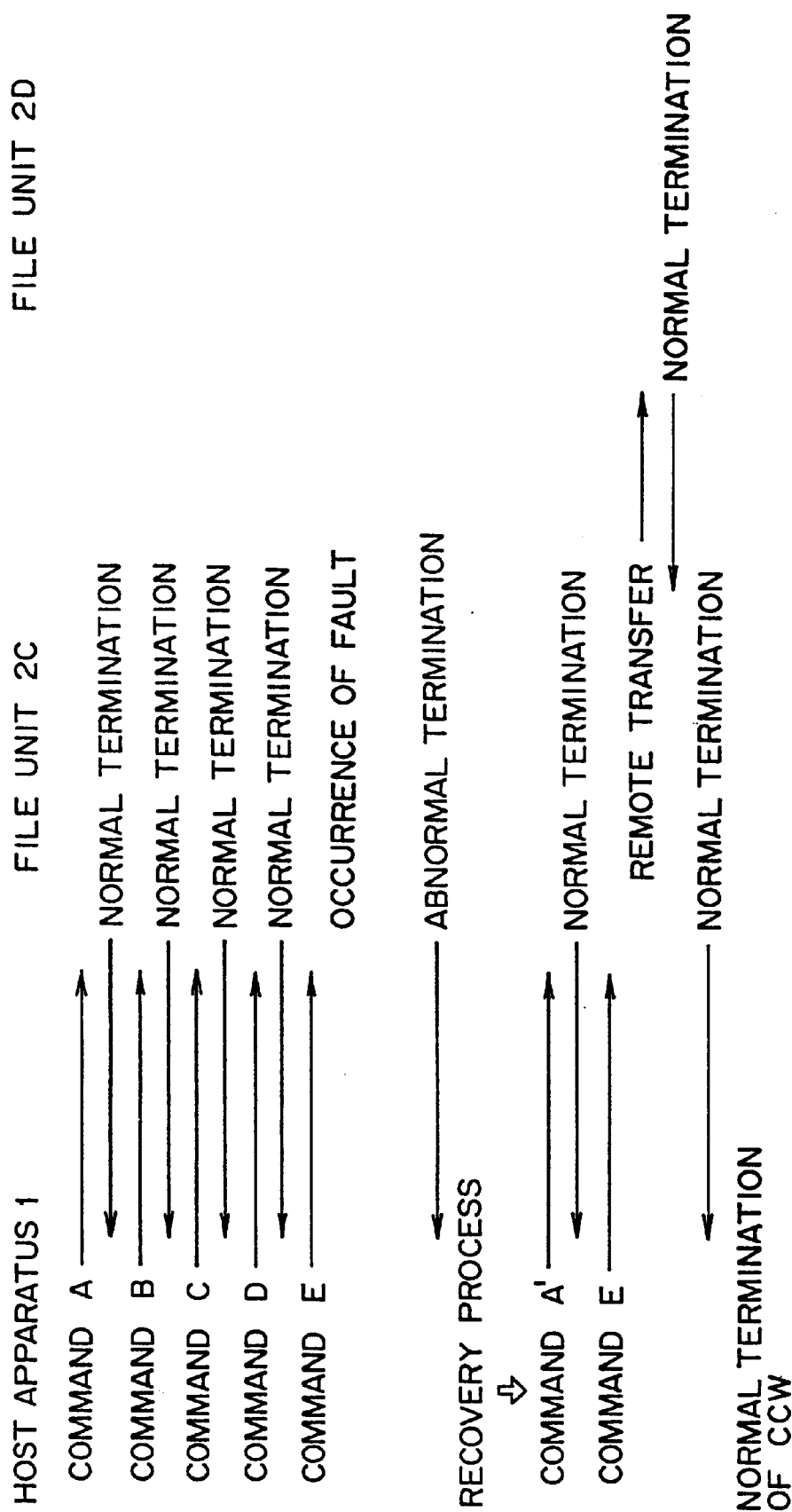
FIG. 16 is a sequence diagram showing an example in which the recovery process procedure is simplified.
Figure 17:
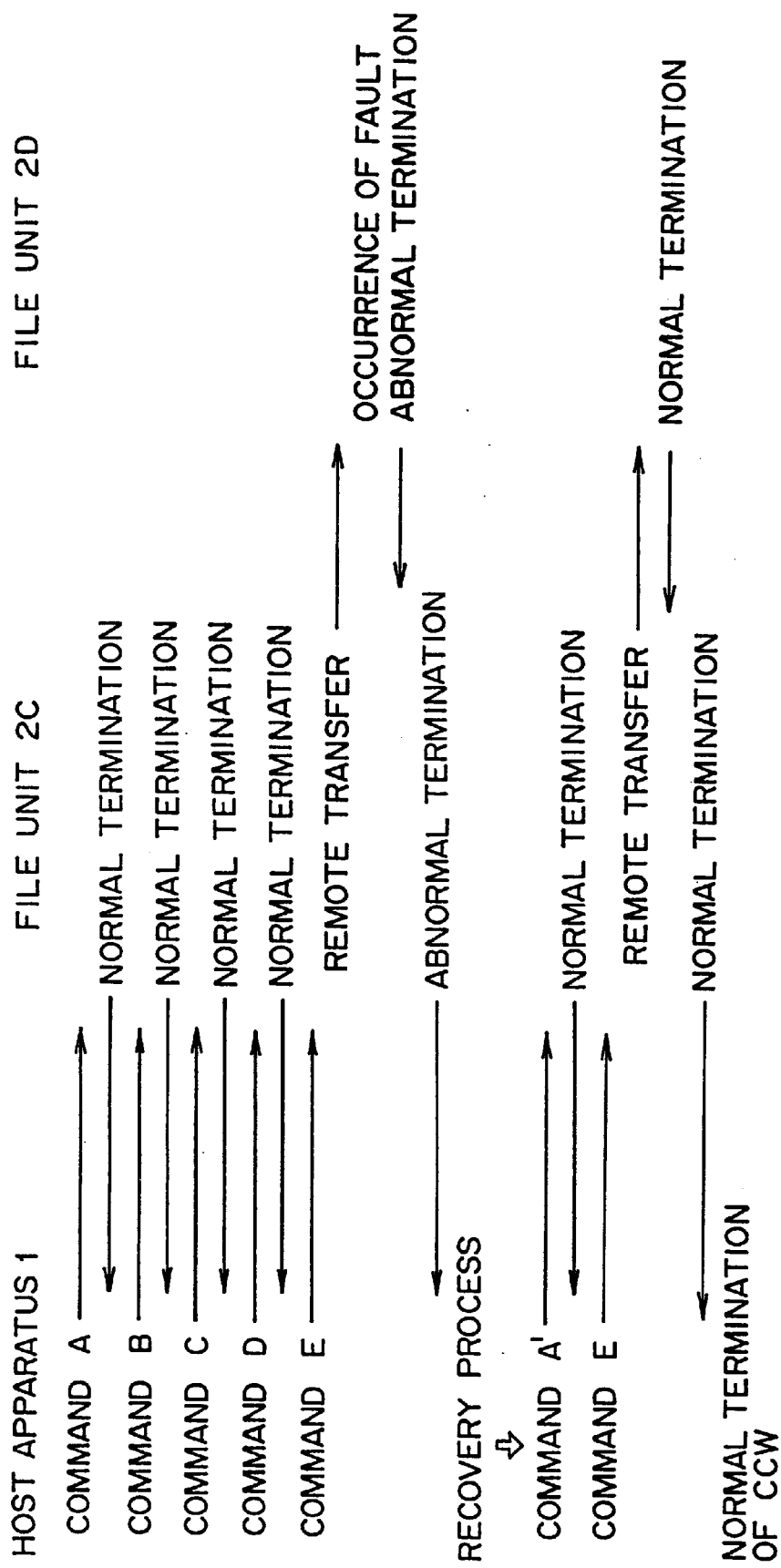
FIG. 17 is a sequence diagram showing a concrete example in which a fault occurs in the known remote transfer and the host apparatus performs the recovery procedure in the procedure shown in FIG. 16.

Even if any fault occurs while a series of write commands are processed, data written by write commands having been issued before a command issued at the time that the fault has occurred is certainly duplicated. Accordingly, when the host apparatus 1 performs the recovery process in order to cope with the fault, even if the host apparatus 1 modifies a part of the commands to simplify the recovery process and performs the recovery process by issuing write commands after the command which has been issued at the time that a fault has occurred, as shown in, for example, FIG. 16, a trouble occurring heretofore does not occur, and equivalence of data in the two file units 2C and 2D is certainly assured.

[B] Description of a Procedure for Coping with a Case Where a Disconnection Factor Appears in the Remote Transfer Next, a procedure for coping with a case where a disconnection factor appears in the remote transfer will be described with reference to FIGS. 2 through 5.

[B-1] In the Case Where a Disconnection Factor Appears in the Primary File Unit 2C When the primary file unit 2C gets into a state where the primary file unit 2C has to be temporarily disconnected from the host apparatus 1 due to any factor, that is, when any factor requiring that the primary file unit 2C and the host apparatus 1 have to be temporarily disconnected appears, in the primary file unit 2C the CA 11 connected to the channel 1a notifies the RA(P) 14 connected to the secondary file unit 2D, using the inter-module communication area 16a, that disconnection from the channel 1a appears, to temporarily disconnect a connection between the primary file unit 2C and the secondary file unit 2D with the disconnection from the channel 1a. For this purpose, in this embodiment, a special disconnect interface is provided.

The primary file unit 2C cannot continue the command process even though the secondary file unit 2D can do a continuous process (chaining) of the command operation. Therefore, the special disconnect interface issues a code showing disconnection of the secondary file unit 2D from the primary file unit 2C, reconnects the primary file unit 2C and the secondary file unit 2D by issuing a code showing reconnection from the primary file unit 2C when the primary file unit 2C becomes an operable state, and allows the secondary file unit 2D to keep a state in which the secondary file unit 2D can be reconnected at any time.

The above disconnection factor is caused by lack of capacity of the cache memory 16, or by a write through operation, etc.

When an event requiring the channel 1a and the CA 11 to be disconnected from each other occurs in the primary file unit 2C due to lack of capacity of the cache memory 16, or by the write through operation, etc., time-out based on ESCON interface specifications may occur if the file units 2C and 2D are not disconnected until the event is settled. In ESCON interface, since communication is basically made using a block called a frame, a latency between frames is decided.

According to this embodiment, the primary file unit 2C notifies the secondary file unit 2D that, when a path is established between the RA(S) 14 and the RA(P) 14, the path is not an ordinary connection with the channel 1a but a connection between the file units 2C and 2D. The RA(S) 14 can accept a disconnection request from the path, which is not originally issued from the channel 1a. When receiving a disconnection request from the RA(P) 14, the RA(S) 14 accepts the request, and performs a process to disconnect a connection between the file units 2C and 2D, and memorizes a state at the time of the disconnection in an information storage area in the secondary file unit 2D until a reconnect request is issued from the primary file unit 2C.

According to this embodiment, when an event that requires to disconnect CA 11 of primary file unit 2C from the channel 1a occurs, the CA 11 of the primary file unit 2C requests the RA(P) 14, by using the inter-module communication area 16a, to issue a disconnect request (that is, to carry out a temporary disconnect process between the file units 2C and 2D). CA 11 is then disconnected from the channel 1a, performs a necessary disconnect process (channel disconnect process) with the RM 12 of the primary file unit 2C, then returns to the idle state.

Figure 2:
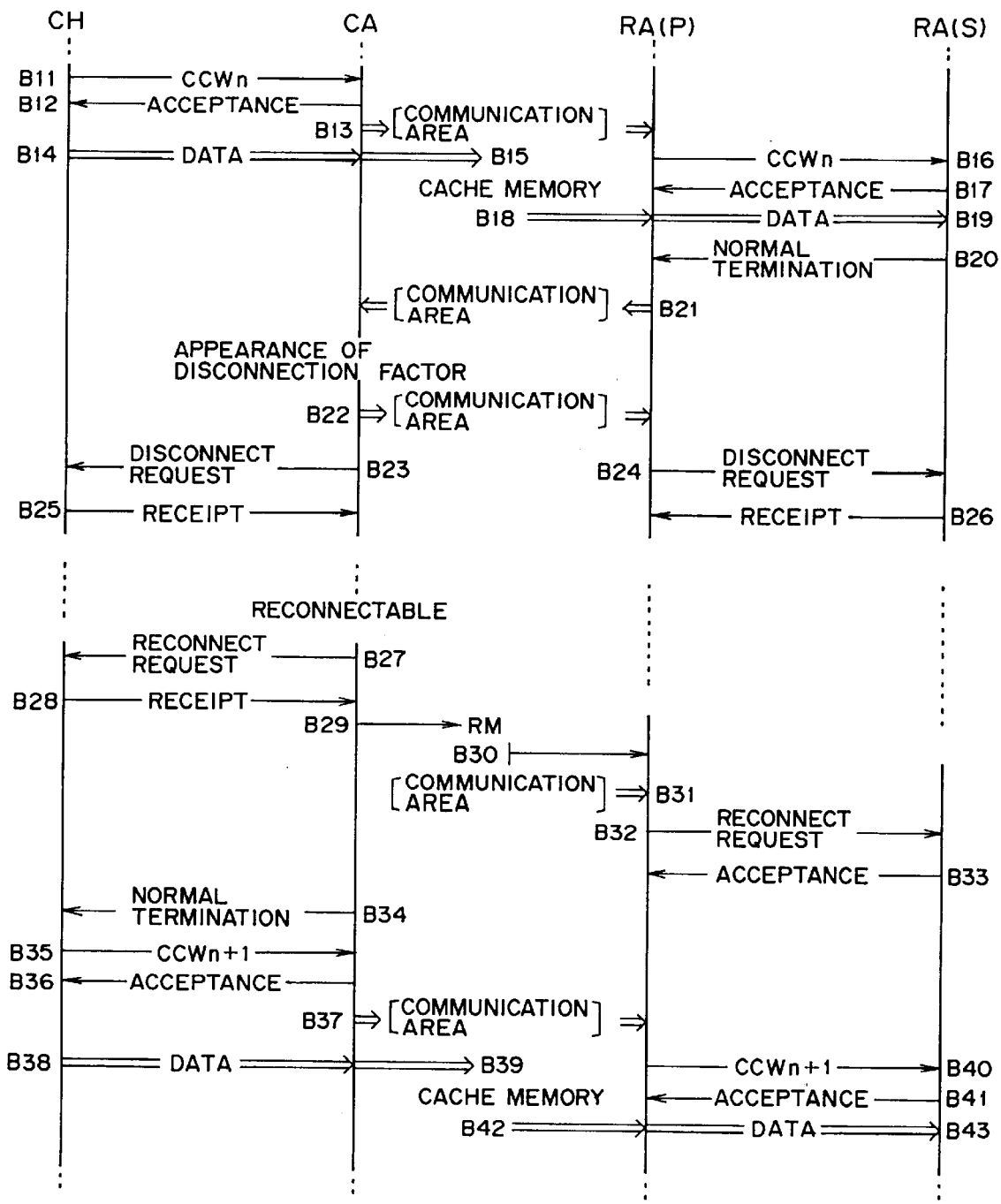
FIG. 2 is a sequence diagram for illustrating a procedure for coping with a case where a disconnect factor appears in a primary file unit in the remote transfer according to the embodiment.

FIG. 2 is a sequence diagram for illustrating a procedure coping with a case where a disconnection factor appears in the primary file unit 2C in the remote transfer according to this embodiment. FIG. 2 shows a case where a disconnection factor appears in the primary file unit 2C while a write command CCWn is processed.

In FIG. 2, a process after the host apparatus 1 transmits the write command CCWn from the channel 1a to the CA 11 of the primary file unit 2C up to the time that the RA(P) 14 notifies the CA 11 via the communication area 16a of normal termination from the RA(S) 14, that is, a process denoted by arrows B11 to B21, corresponds to the process denoted by the arrows A64 to A74 in FIG. 1, description of which is thus omitted.

If a disconnect factor appears in the primary file unit 2C when the RA(P) 14 notifies the CA 11 via the communication area 16a of normal termination from the RA(S) 14 (refer to an arrow B21), according to this embodiment, the CA 11 requests the RA(P) 14, by using the inter-module communication area 16a, to issue a disconnect request (refer to an arrow B22), issues a disconnect request to the channel 1a to be disconnected from the channel 1a (refer to arrows B23 and B25), performs a necessary disconnect process (channel disconnect process) with the RM 12 of the primary file unit 2C, then returns to the idle state.

The RA(P) 14 issues, in response to the request from the CA 11, a disconnect request to the RA(S) 14 with which the RA(P) 14 is now connected (refer to arrows B24 and B26). The RA(S) 14, having received the disconnect request from the RA(P) 14, performs a disconnect process to disconnect a connection between the file units 2C and 2D, and memorizes a state at the time of the disconnection in the information storage area in the Secondary file unit 2D until a reconnect request is issued from the primary file unit 2C.

The RA(S) 14 of the secondary file unit 2D, having received the disconnect request, writes into a control information storage area in the secondary file unit 2D that the disconnect request has been received from the host apparatus 1, notifies the RM 12 of the secondary file unit 2D that temporary disconnection occurs responsive to the disconnect request from the host apparatus 1, then returns to the idle state. The RM 12 having received the above directive from the RA(S) 14 of the secondary file unit 2D does not initiate any action with respect to the process until the RM 12 again receives a connect request from the same RA(S) 14.

The RA(P) 14, having issued the disconnect request to the RA(S) 14, temporarily disconnects a connection between the file units 2C and 2D, performs a necessary process (remote transfer disconnect process) with the RM 12 of the primary file unit 2C, then returns to the idle state, as well.

After that, when the disconnection factor is settled and the channel 1a and the CA 11 get into a re-connectable state in the primary file unit 2C, the CA 11 makes a reconnect request to the channel 1a (refer to an arrow B27), is reconnected thereto (refer to an arrow B28), and requests the RM 12 of the primary file unit 2C to assign the RA(P) 14 in order to direct reconnection with the secondary file unit 2D (refer to arrows B29 and B30). The RA(P) 14, having again requested by the RM 12 for the remote transfer operation, reads information in the relevant inter-module communication area 16a once more (refer to an arrow B31) to restore the information before the disconnection, issues a reconnect request to the RA(S) 14 of the secondary file unit 2D having requested for temporary disconnection (refer to an arrow B32), and performs reconnection.

The RA(S) 14, having received the reconnect request, notifies the RM 12 of the secondary file unit 2D that the reconnect request is directed by the primary file unit 2C, replies to the RA(P) 14 of the primary file unit 2C that the RA(S) 14 accepts the reconnection (refer to an arrow B33), reads necessary information from the control information storage area in the secondary file unit 2D, and returns to a state before the temporary disconnection occurs to continue the process.

The CA 11 of the primary file unit 2C, having requested the channel 1a for reconnection, notifies the channel 1a of normal termination (refer to an arrow B34), thereby returning to a state before the temporary disconnection occurs to continue the process. The host apparatus 1 thereby issues a write command CCWn+1 next to the write command CCWn, which has been processed at the time that the disconnection factor has appeared, to the CA 11 of the primary file unit 2C (refer to an arrow B35), so that the similar remote transfer process is resumed (refer to arrows B36 to B43).

According to this embodiment, when a disconnection factor appears in the primary file unit 2C, not only the primary file unit 2C and the host apparatus 1, but also the primary file unit 2C and the secondary file unit 2D are temporarily disconnected from each other until the factor is settled, as described above. The secondary file unit 2D and the host apparatus 1 can therefore carry out another process without waiting for settlement of the factor, which leads to their efficient operations.

[B-2] In the Case Where a Disconnection Factor Appears in the Secondary File Unit 2D When the secondary file unit 2D gets into a state where the secondary file units 2D has to be temporarily disconnected from the primary file unit 2C due to any factor, that is, when a disconnection factor requiring that the secondary file unit 2D and the primary file unit 2C have to be temporarily disconnected from each other appears, the primary file unit 2C according to this embodiment gives, from the RA module connected to the RA(S) 14 to the CA 11 connected with the channel 1a, via the inter-module communication area 16a, notice that a disconnect request is received from the secondary file unit 2D, and can perform temporary disconnect process from the channel 1a.

Figure 3:
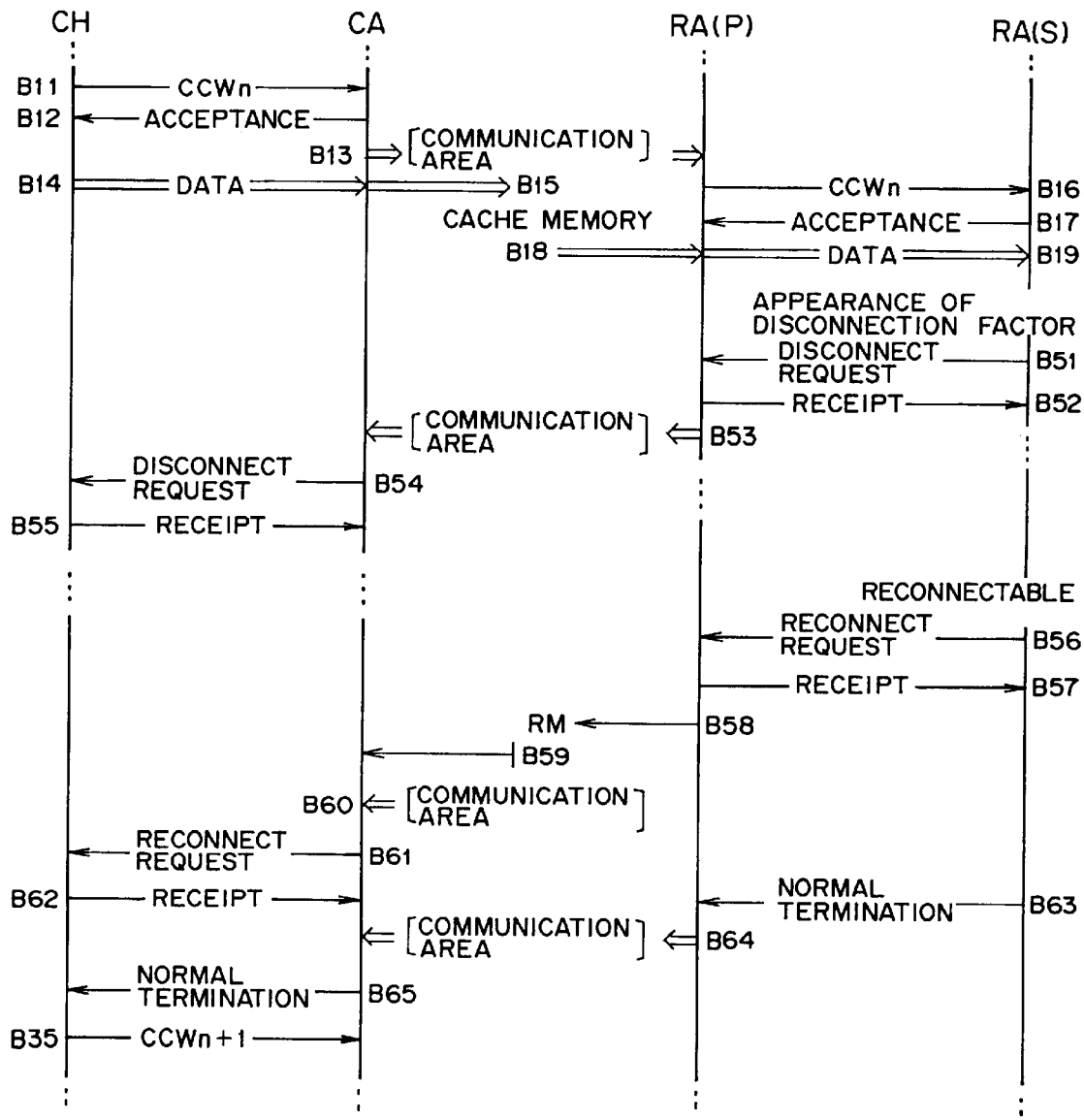
FIG. 3 is a sequence diagram for illustrating a procedure for coping with a case where a disconnect factor appears in a secondary file unit in the remote transfer according to the embodiment.

FIG. 3 is a sequence diagram for illustrating a procedure for coping with a case where a disconnection factor appears in the secondary file unit 2D in the remote transfer according to this embodiment. FIG. 3 shows a case where a disconnection factor appears in the secondary file unit 2D when a write command CCWn is processed.

In FIG. 3, a process after the host apparatus 1 transmits the write command CCWn to the CA 11 of the primary file unit 2C from the channel 1a up to the time that the RA(S) 14 receives data from the RA(P) 14, that is, a process denoted by arrows B11 to B19, corresponds to the process denoted by the arrows A64 to A72 in FIG. 1, description of which is thus omitted.

In an event that requires to disconnect the RA(S) 14 from the RA(P) 14 because of a disconnection factor (for example, lack of capacity of the cash memory 16) in the secondary file unit 2D appears when the RA(S) 14 receives data from the RA(P) 14 (refer to an arrow B19), according to this embodiment, the RA(S) 14 of the secondary file unit 2D issues a disconnect request to the RA(P), that is the upper apparatus, similarly to the CA 11 connected to the general channel 1a (refer to arrows B51 and B52).

The RA(P) 14 of the primary file unit 2C, having received the disconnect request from the RA(S) 14 of the secondary file unit 2D, makes a disconnect request to the CA 11 by using the inter-module communication area 16a (refer to an arrow B53), and performs a temporary disconnection between the file units 2C and 2D. The RA(P) 14 and the RA(S) 14 perform necessary processes (respective disconnect processes) on their respective RMs 12, then return to the idle state.

The CA 11, having received the disconnect request from the RA(P) 14, issues a disconnect request to the channel 1a to be disconnected therefrom (refer to arrows B54 and B55), performs a necessary disconnect process (channel disconnect process) with the RM 12 of the primary file unit 2C, then returns to the idle state.

When the disconnect factor is settled in the secondary file unit 2D and the secondary file unit 2D gets into a state where the secondary file unit 2D is re-connectable to the primary file unit 2C, the RA(S) 14 of the secondary file unit 2D makes a reconnect request to the RA(P) 14 of the primary file unit 2C (refer to arrows B56 and B57).

The RA(P) 14, having received the reconnect directive, requests the RAM 12 of the primary file unit 2C to reconnect the CA 11 to the channel 1a (refer to an arrow B58). The CA 11 directed by the RM 12 to be again connected to the channel 1a reads information in the relevant inter-module communication area 16a once more (refer to arrows B59 and B60), makes a reconnect request to the channel 1a (refer to an arrow B61), and reconnects the channel 1a to the CA 11 (refer to an arrow B62) to continue the process.

Notification of normal termination from the RA(S) 14 is sent to the channel 1a via the RA(P) 14, the inter-module communication area 16a and the CA 11 (refer to arrows B63 to B65), whereby the primary file unit 2C returns to a state before the temporary disconnect occurs to continue the process. The host apparatus 1 thereby issues a write command CCWn+1 next to the write command CCWn, which has been processed at the time that the disconnect factor has appeared, to the CA 11 of the primary file unit 2C (refer to an arrow B35) so that the remote transfer process is resumed.

According to this embodiment, when a disconnect factor appears in the secondary file unit 2D, not only the secondary file unit 2D and the primary file unit 2C, but also the primary file unit 2C and the host apparatus 1 are temporarily disconnected from each other until the factor is settled, so that the primary file unit 2c and the host apparatus 1 can carry out another process without waiting for settlement of the factor, which leads to their efficient operations.

[B-3] In the Case Where Disconnect Factors Simultaneously Appear in Both the Primary File Unit 2C and the Secondary File Unit 2D (1)

When a request to disconnect the primary file unit 2C from the channel 1a and a remote transfer disconnect request from the secondary file unit 2D simultaneously are issued, according to this embodiment, the remote transfer disconnect request from the secondary file unit 2D is suppressed and the request to disconnect from the channel 1a is given priority, and the above-described special disconnect interface works on the secondary file unit 2D.

Figure 4:
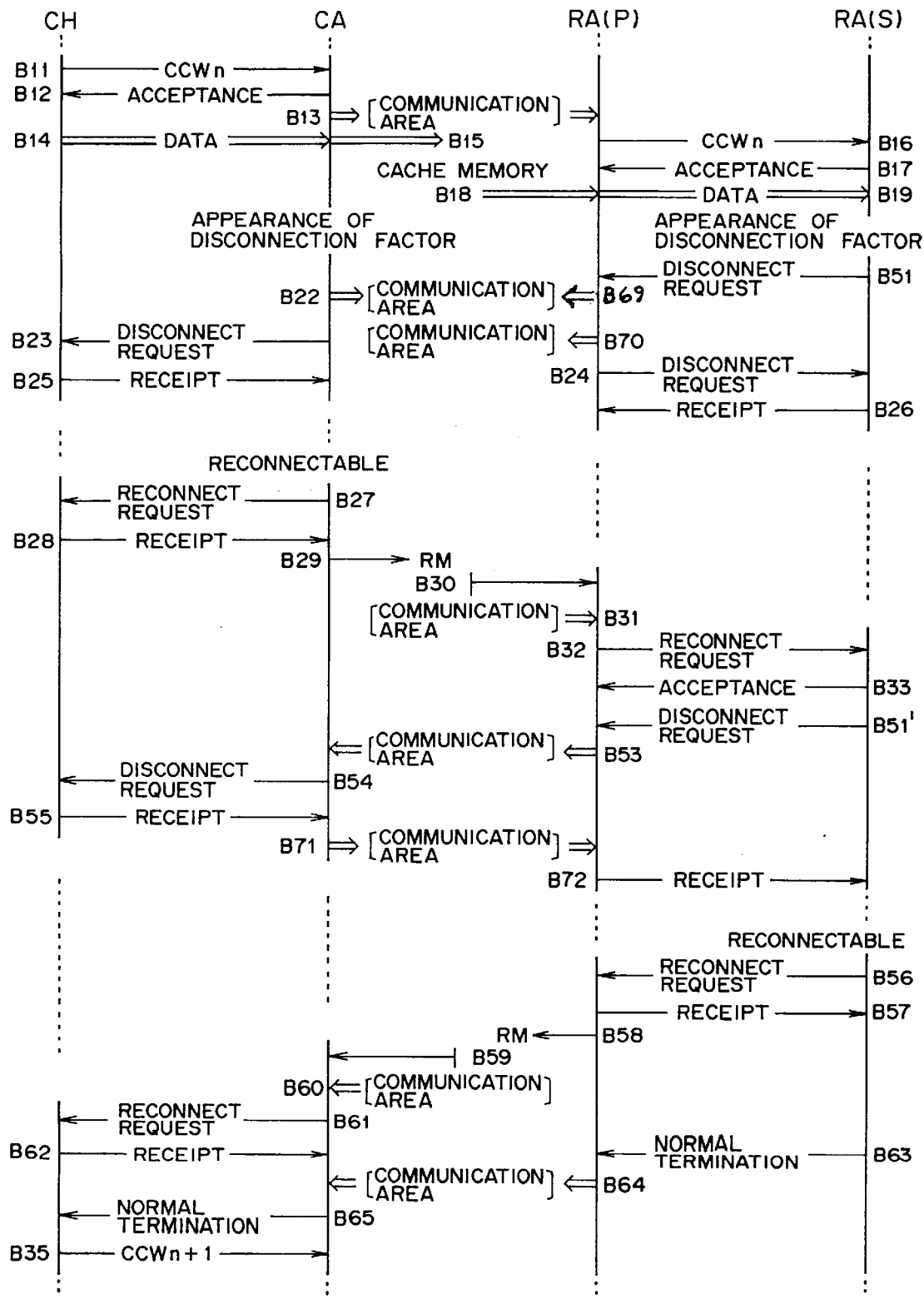
FIG. 4 is a sequence diagram for illustrating a procedure for coping with a case where disconnect factors simultaneously appear in the primary file unit and the secondary file unit in the remote transfer according to the embodiment.

FIG. 4 is a sequence diagram for illustrating a procedure coping with a case where disconnect factors simultaneously appear in both the primary file unit 2C and the secondary file unit 2D in the remote transfer according to this embodiment. FIG. 4 shows a case where disconnect factors simultaneously appear in both the primary file unit 2C and the secondary file unit 2D when a write command CCWn is processed.

In FIG. 4, a process after the host apparatus 1 transmits the write command CCWn to the CA 11 of the primary file unit 2C from the channel 1a up to the time that the RA(S) 14 receives data from the RA(P) 14, that is, a process denoted by arrows B11 to B19, corresponds to the process denoted by the arrows A64 to A72 in FIG. 1, description of which is thus omitted. In FIG. 4, arrows denoted by the same reference characters as those in FIGS. 2 and 3 designate the same or almost the same operations/procedures, description of which is thus omitted.

If disconnect factors simultaneously appear in both the primary file unit 2C and the secondary file unit 2D when the RA(S) 14 receives data from the RA(P) 14 (refer to an arrow B19), both the CA 11 of the primary file unit 2C and the RA(S) 14 of the secondary file unit 2D issue disconnect requests to the RA(P) 14 of the primary file unit 2C (refer to arrow B24 and B51).

At this time, the disconnect request from the CA 11 of the primary file unit 2C is given priority, while the disconnect request from the RA(S) 14 of the secondary file unit 2D is ignored, and the disconnect request described above with reference to FIG. 2 is made to the RA(S) 14 of the secondary file unit 2D now connected to the RA(P) 14 (refer to arrows B24 and B26).

When receiving the disconnect request from the RA(S) 14 of the secondary file unit 2D, the RA(P) 14 of the primary file unit 2C at once writes the disconnect request from the RA(S) 14 into the inter-module communication area 16a (refer to an arrow B69). However, when recognizing that the disconnect request from the CA 11 simultaneously is issued, the RA(P) 14 directs the inter-module communication area 16a to withdraw the disconnect request from the RA(S) 14 (refer to an arrow B70).

When the RA(P) 14 of the primary file unit 2C, that is the upper apparatus, directs a disconnect request against the disconnect request issued from the secondary file unit 2D, the secondary file unit 2D internally withdraws the disconnect request made by itself, and accepts the disconnect request directed by the primary file unit 2C (refer to arrows B24 and B26).

Therefore, when the RA(P) 14 accepts a disconnect request directed by he RA(S) of the secondary file unit 2D after reconnection (refer to an arrow B51'), the RA(P) 14 confirms via the inter-module communication area 16a that the channel 1a and the CA 11 of the primary file unit 2C are disconnected from each other by the directive (refer to an arrow B71), and then sends back receipt of the disconnect request to the RA(S) 14 of the secondary file unit 2D (refer to an arrow B72).

Meanwhile, the CA 11 of the primary file unit 2C having priority is disconnected from the channel 1a by its own disconnect request, irrespective of a state of connection between the file units 2C and 2D.

The disconnect request from the primary file unit 2C is given priority, and when the disconnect factor in the primary file unit 2C is settled in a state where the primary file unit 2C and the host apparatus 1, and the primary file unit 2C and the secondary file unit 2D are temporarily disconnected, reconnection is performed in the procedure described above with reference to FIG. 2 (refer to arrows B27 to B33).

When the host apparatus 1 and the primary file unit 2C, and the primary file unit 2C and the secondary file unit 2D are respectively reconnected, the host apparatus 1 and the primary file unit 2C, and the primary file unit 2C and the secondary file unit 2D are respectively temporarily disconnected again due to the disconnection factor that has not been yet settled in the secondary file unit 2D. When the disconnection factor in the secondary file unit 2D is settled, reconnection is performed in the procedure described above with reference to FIG. 3 (refer to arrows B56 to B65).

As described above, according to this embodiment, when disconnection factors simultaneously appear in both the primary file unit 2C and the secondary file unit 2D, the primary file unit 2C and the host apparatus 1, and the primary file unit 2C and the secondary file unit 2D are respectively temporarily disconnected. After that, the disconnection factor in the primary file unit 2C is preferentially settled, and then the disconnection factor in the secondary file unit 2D is settled. It is therefore possible to cope with a case where disconnection factors simultaneously appear in both the primary file unit 2C and the secondary file unit 2D.

[B-4] In the Case Where Disconnect Factors Simultaneously Appear in Both the Primary File Unit 2C and the Secondary File Unit 2D (2)

In the example shown in FIG. 4, when disconnect factors simultaneously in both the primary file unit 2C and the secondary file unit 2D, the disconnection factor in the primary file unit 2C is settled and the file units 2C and 2D are reconnected, the file units 2C and 2D are again disconnected due to the disconnection factor in the secondary file unit 2D, after that, the disconnection factor in the secondary file unit 2D is settled.

Figure 5:
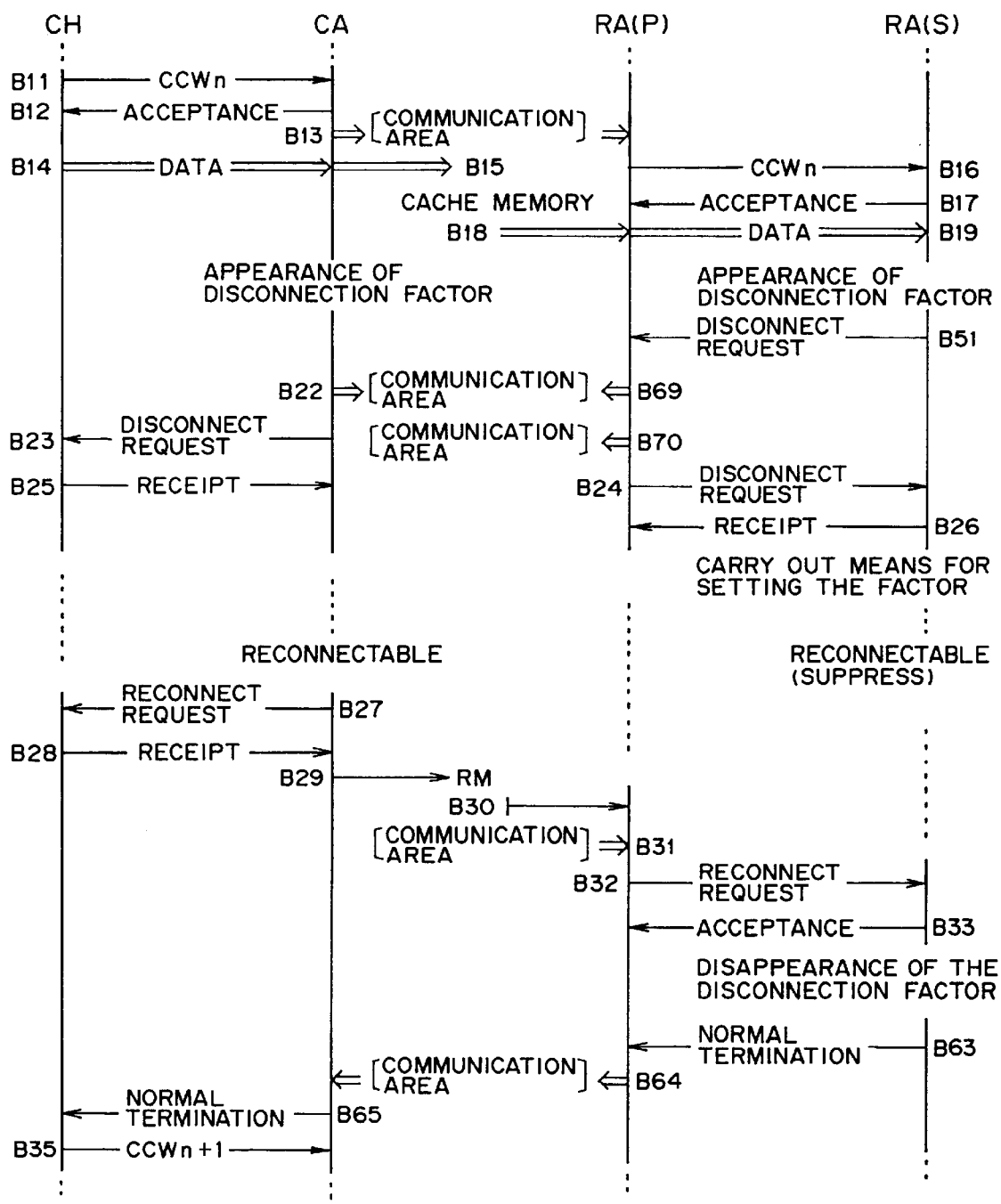
FIG. 5 is a sequence diagram for illustrating a modified example of the procedure for coping with a case where disconnect factors simultaneously appear in the primary file unit and the secondary file unit in the remote transfer according to the embodiment.

On the other hand, in a coping procedure shown in FIG. 5, when a request to disconnect the primary file unit 2C from the channel 1a and a remote transfer disconnect request from the secondary file unit 2D simultaneously are issued, priority is given to the request to disconnect the primary file unit 2C from the channel 1a. Even if the special disconnect interface operates on the secondary file unit 2D according to a directive from the upper apparatus, a problem (disconnection factor) that is the remote transfer disconnection factor causing disconnection directed by the upper apparatus is concurrently settled in the secondary file unit 2D so as to lower probability of recurrence of the remote transfer disconnect request after the secondary file unit 2D is reconnected to the primary file unit 2C.

FIG. 5 is a sequence diagram for illustrating a modified example of the procedure coping with a case where disconnection factors simultaneously appear in both the primary file unit 2C and the secondary file unit 2D in the remote transfer according to this embodiment. FIG. 5 shows a case where disconnection factors simultaneously appear in both the primary file unit 2C and the secondary file unit 2D when a write command CCWn is processed, similarly to the example shown in FIG. 4

In FIG. 5, a process after the host apparatus 1 transmits the write command CCWn to the CA 11 of the primary file unit 2C from the channel 1a up to the time that the RA(S) 14 receives data from the RA(P) 14, that is, a process denoted by arrows B11 to B19, corresponds to the process denoted by the arrows A64 to A72 in FIG. 1, description of which is thus omitted. In FIG. 5, arrows denoted by the same reference characters in FIGS, 2 through 4 show the same or almost the same operations/procedures, description of which is thus omitted.

The coping procedure shown in FIG. 5 and the coping procedure shown in FIG. 4 differ in the following effect. In the coping procedure shown in FIG. 5, even if its own disconnect request is withdrawn by a disconnect request from the upper apparatus in the secondary file unit 2D, the secondary file unit 2D carries out a means to settle a disconnection factor appeared in the secondary file unit 2D until the secondary file unit 2D is reconnected to the primary file unit 2C, and settles the disconnection factor. This means is actuated in a disconnect process with the RM 12, performed by the RA(S) 14 in the secondary file unit 2D.

Accordingly, in both the primary file unit 2C and the secondary file unit 2D, the events that has caused disconnection factors are settled in parallel. When a reconnect request is sent from the primary file unit 2C (refer to an arrow B32) the process can be continued without a disconnect directive from the secondary file unit 2D unlike the example shown in FIG. 4.

Namely, at a point of time that a reconnect request is received in the secondary file unit 2D, the disconnection factor has been already settled. Therefore, notification of normal termination is immediately sent from the RA(S) 14 to the channel 1a via the RA(P) 14, the inter-module communication area 16a and the CA 11 (refer to arrows B63 to B65), and the remote transfer process is resumed.

According to this embodiment, when disconnection factors simultaneously appear in both the primary file unit 2C and the secondary file unit 2D, the disconnection factor in the primary file unit 2C and the disconnection factor in the secondary file unit 2D are simultaneously settled. This can diminish probability of occurrence of disconnect request by the secondary file unit 2D after the primary file unit 2C and the secondary file unit 2D are reconnected, thus can shorten a response time up to the time that normal termination (termination status) is notified to the host apparatus 1.

[C] Description of Parallelizing of the Remote Transfer Process

[C-1] Description of an Example of Parallelizing

Figure 6:
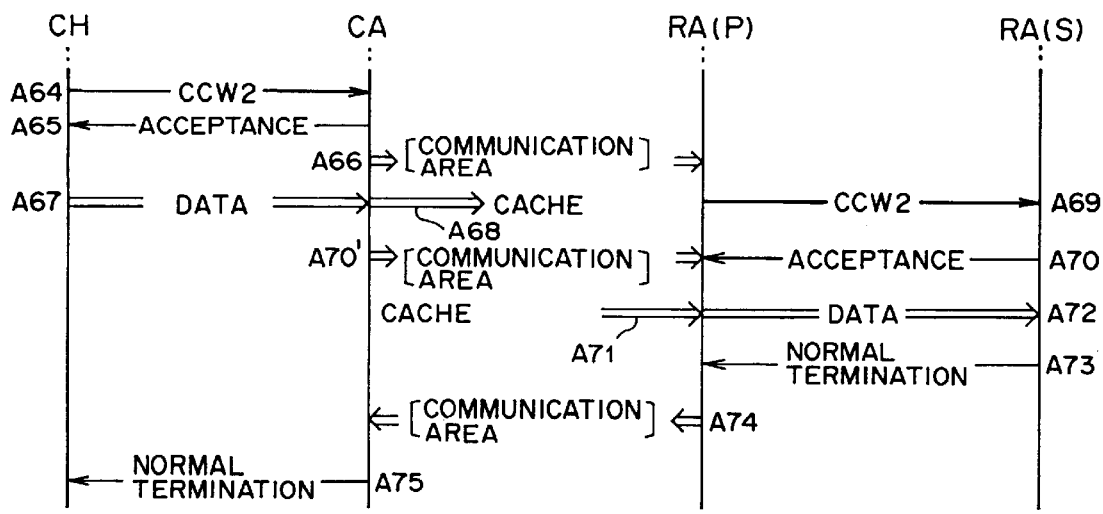
FIG. 6 is a sequence diagram for illustrating an example in which a part of the processes is parallelized in the remote transfer according to the embodiment.

FIG. 6 is a sequence diagram for illustrating an example of parallelizing of a part of the process at the time of the remote transfer according to this embodiment. In FIG. 6, a part relating to the process by the write command CCW2 shown in FIG. 1 is taken out and shown. In FIG. 6, arrows denoted by the same reference characters in FIG. 1 show the same or almost the same operations/procedures, detailed description of which is thus omitted.

As shown in FIG. 6, when the CA 11 of the primary file unit 2C receives a command code from the channel 1a for the write command CCW2 directed by the host apparatus 1 (refer to an arrow A64), the CA 11 notifies the RA(P) 14 of only the command code using the inter-module communication area 16a in the primary file unit 2C (refer to an arrow A66) At the same time, the CA 11 answers with a command reception status (initial status) to the channel 1a (refer to an arrow A65), receives data of the write command CCW2 accepted from the channel 1a (refer to an arrow A67), and writes the data into the cache memory 16 (refer to an arrow A68).

The RA(P) 14, notified of the write command CCW2, now being executed by the CA 11, via the inter-module communication area 16a, issues the similar command code to the secondary file unit 2D (refer to an arrow A69), and likewise receives the initial status from the secondary file unit 2D.

When the data transfer between the channel 1a and the CA 11 is completed, the CA 11 notifies the RA(P) 14 via the inter-module communication area 16a that the data transfer is completed (refer to an arrow A70'). The RA(P), having received this notification, reads the data from the cache memory 16, and transfers the data to the secondary file unit 2D.

According to this embodiment, the data received by the CA 11 is started to be transferred from the RA(P) 14 of the primary file unit 2C to the secondary file unit 2D as soon as the data transfer between the channel 1a and the CA 11 is completed (refer to arrows A71 and A72). In this manner, this embodiment parallelizes a part of the write command process.

In the following, more detailed description of the parallelizing of a part of the write command process, as described above, will be made.

Between the channel 1a and the CA 11 of the primary file unit 2C, and between the RA(P) 14 of the primary file unit 2C and the RA(S) 14 of the secondary file unit 2D, a process for each command is performed as follows: Namely, the upper apparatus issues a command, the CA 11 and the RA(S) 14 respectively receive the command. When the command is processible, acceptance (initial status) of the command is returned to the upper apparatus. When the command is accepted, data accompanying the command is transferred. When all the command processes including the data transfer are finally completed, each of the CA 11 and the RA(S) 14 returns termination status to the upper apparatus, thereby completing one command process.

Here, the upper apparatus for the CA 11 of the primary file unit 2C is the channel 1a, and the upper apparatus for the RA(S) of the secondary file unit 2D is the RA(P) 14 of the primary file unit 2C. In data transfer, data is sent to the CA 11 and the RA(S) 14 from the upper apparatus in the case of the write process.

Once the initial status is sent back from the CA 11 of the primary file unit 2C to the channel 1a, it is possible to issue a command between the RA(P) 14 of the primary file unit 2C and the RA(S) 14 of the secondary file unit 2D and receive the initial status, as well.

The CA 11 of the primary file unit 2C, having sent back the initial status, accepts a command, and notifies the channel 1a via the inter-module communication area 16a that data of the command is now being transferred, whereby concurrently carrying out both the data transfer process (data receive process) between the channel 1a and the CA 11 of the primary file unit 2C and a command accept process between the RA(P) 14 of the primary file unit 2C and the RA(S) 14 of the secondary file unit 2D, so as to shorten the process time.

The parallelizing of a part of the write command process as described above is applied to not only the write command CCW2 but also another write command in the manner similar to the above.

According to this embodiment, in the remote transfer responsive to a write command from the host apparatus 1, the data transfer process from the host apparatus 1 to the primary file unit 2C and the command accept process between the primary file unit 2C and the secondary file unit 2D are carried out in parallel. As soon as the data is received, the data is remote-transferred, thereby increasing the speed of the remote transfer process.

[C-2] Description of Another Example of Parallelizing

Figure 7:
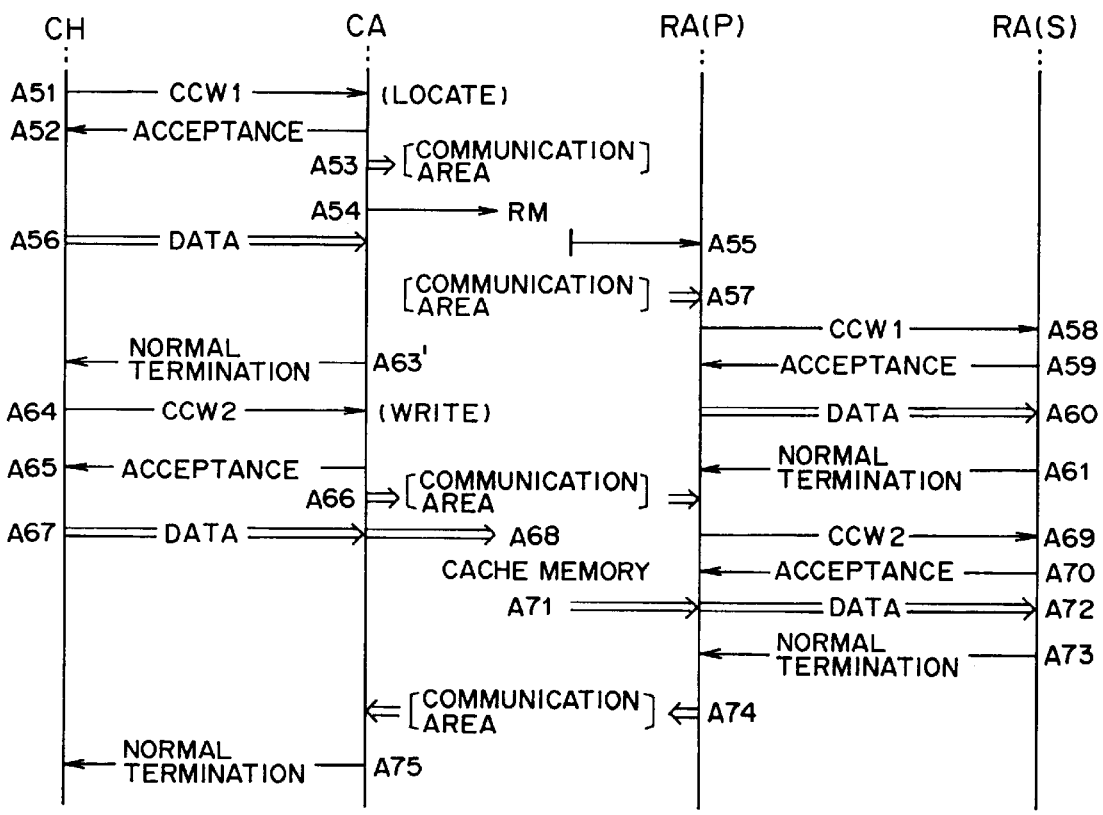
FIG. 7 is a sequence diagram for illustrating another example in which a part of the processes is parallelized in the remote transfer according to the embodiment.
Figure 8:
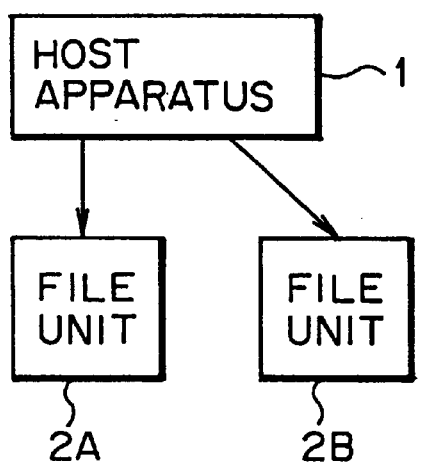
FIG. 8 is a block diagram for illustrating an example of known data duplicating techniques.
Figure 9:
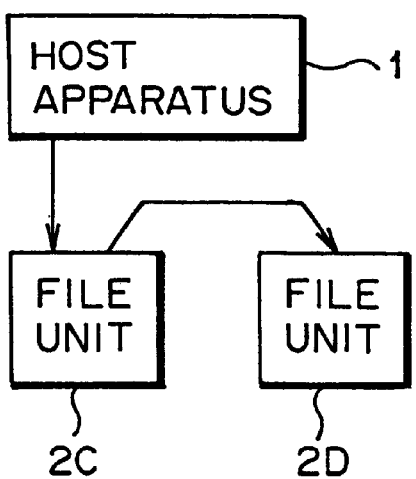
FIG. 9 is a block diagram for illustrating another example of the known data duplicating techniques.

FIG. 7 is a sequence diagram for illustrating another example of parallelizing of a part of the process in the remote transfer according to this embodiment. In FIG. 7, only the part relating to processes by the write operation directive command CCW1 and the write command CCW2 shown in FIG. 1 is taken out and shown. In FIG. 7, arrows denoted by the same reference characters described hereinbefore designate the same or almost the same operations/procedures, description of which is thus omitted.

As shown in FIG. 7, the CA 11 of the primary file unit 2C notifies the RA(P) 14 via the inter-module communication area 16a of a demand to process a command (Locate Record, Seek+Search ID, or the like) CCW1 directing a write operation from the host apparatus 1 (refer to arrows A51, A53 to A55, and A57). Even after receiving data (parameters of Locate Record, information on Seek+Search ID, or the like) of the command CCW1, the CA 11 of the primary file unit 2C receives the first write command CCW2, following the write operation directive command CCW1 from the host apparatus 1 (refer to an arrow A64), without waiting for a process termination report on the command, notified the CA 11 from the RA(P) 14.

The CA 11 precedently reserves the next write command CCW2 at the RA(P) 14, transfers data of the write command CCW2. After that, the RA(P) 14 waits for termination of the relevant write operation directive command CCW1 and the next write command CCW2, and the CA 11 reports the channel 1a of termination of the write command CCW2. Whereby, it is possible to perform in parallel the process of transferring data of the first write command CCW2 following the write operation directive command CCW1 to the CA 11 of the primary file unit 2C from the channel 1a, and the accept process that should be completed between the primary file unit 2C and the secondary file unit 2D before transfer of the first write data from the primary file unit 2C to the secondary file unit 2D is initiated.

The write operation directive command CCW1 is a command determining operative conditions for the following write commands CCW2 to CCWm to operate, and locating the devices. There is no case where data in the cache memory 16 is updated by the command CCW1. Data relating to the command CCW1 is stored in the inter-module communication area 16a.

In the parallelizing technique shown in FIG. 7, the command sequence performed between the channel 1a and the CA 11 of the primary file unit 2C is extended to the following write command CCW2, and the CA 11 of the primary file unit 2C does not monitor a status between the file units 2C and 2D until a termination status of the first write command CCW2 is reported.

According to this embodiment, the process of transferring data of the first write command CCW2 from the host apparatus 1 to the primary file unit 2C, and the accept process that should be completed between the primary file unit 2C and the secondary file unit 2D until the data of the first write command CCW2 is transferred are performed in parallel, whereby further increasing the speed of the remote transfer.

[D] Others

Note that the present invention is not limited to the above-described embodiment, but may be modified in various ways without departing from the scope of the invention.

Industrial Applicability

According to this invention, when one write access unit (for example, CCW) made up of a write operation directive command and a series of commands following the write operation directive command are executed, remote transfer from the primary file unit to the secondary file unit is performed for each command, whereby write data can be certainly duplicated for each command. Even when any fault occurs while a series of the write commands are processed, data written by the write commands issued before a command at which the fault has occured is certainly duplicated, as described above.

In consequence, the present invention can certainly assure equivalence of data in two file units even if the host apparatus modifies a part of the commands in the recovery process to simplify the recovery process, versatility of the present invention is thus very high.

What is claimed is:

1. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

receiving a writing operation directive command, which is issued by said host apparatus to transfer writing start location information to said primary file unit as data, in said primary file unit;

transferring the received writing operation directive command from said primary file unit to said secondary file unit, when said primary file unit receives said writing operation directive command from said host apparatus, to direct to start the writing;

transferring said writing start location information as data from said primary file unit to said secondary file unit;

giving, from said primary file unit to said host apparatus, notice that transferring said writing start location information has been normally transferred, when said primary file unit confirms that said writing start location information has been normally received by said secondary file unit, to cause said host apparatus to issue a series of write commands, which configures one write access unit together with said writing operation directive command;

receiving one of said series of write commands in said primary file unit;

transferring the received write command from said primary file unit to said secondary file unit, each time said primary file unit receives one of said series of write commands from said host apparatus after said writing operation directive command, to direct the writing;

transferring data to be written by the write command from said primary file unit to said secondary file unit; and giving, from said primary file unit to said host apparatus, notice that the writing by the write command has been normally terminated, when said primary file unit confirms that data written in said primary file unit by the write command has been normally written in said secondary file unit, to cause said host apparatus to issue a next write command.

2. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command , and giving, from said primary file unit to said host apparatus, notice that the writing by said write command has been normally terminated, when said primary file unit confirms that data written in said primary file unit by said write command has been normally written in said secondary file unit, wherein when a factor requiring to temporarily disconnect said primary file unit from said host apparatus appears in said primary file unit while said series of write commands are processed, a disconnect request is issued from said primary file unit to said host apparatus to temporarily disconnect said primary file unit from said host apparatus, and a disconnect request is issued from said primary file unit to said secondary file unit to temporarily disconnect said primary file unit from said secondary file unit;

said factor in said primary file unit is settled; and in response to a reconnect request from said primary file unit, said primary file unit is then reconnected to said host apparatus and said primary file unit is reconnected to said secondary file unit.

3. A remote transfer method used in a file system comprising a primary file unit connected to a host apparatus to be data-updated by said host apparatus, and a secondary file unit connected to said primary file unit to be data-updated by said primary file unit said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command , and giving, from said primary file unit to said host apparatus, notice that the writing by said write command has been normally terminated, when said primary file unit confirms that data written in said primary file unit by said write command has been normally written in said secondary file unit, wherein when a factor requiring to temporarily disconnect said secondary file unit from said primary file unit appears in said secondary file unit while said series of write commands are processed, a disconnect request is issued from said secondary file unit to said primary file unit to temporarily disconnect said secondary file unit from said primary file unit, and a disconnect request is issued from said primary file unit having received said disconnect request to said host apparatus to temporarily disconnect said primary file unit from said host apparatus;

said factor is settled in said secondary file unit; and in response to a reconnect request from said secondary file unit, said secondary file unit is then reconnected to said primary file unit and said primary file unit is reconnected to said host apparatus.

4. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command, and giving, from said primary file unit to said host apparatus, notice that the writing by said write command has been normally terminated, when said primary file unit confirms that data written in said primary file unit by said write command has been normally written in said secondary file unit, wherein when a factor requiring to temporarily disconnect said primary file unit from said host apparatus appears in said primary file unit, and at the same time, a factor requiring to temporarily disconnect said secondary file unit from said primary file unit appears in said secondary file unit, while said series of write commands are processed, a disconnect request from said primary file unit to said host apparatus is issued prior to a disconnect request from said secondary file unit to said primary file unit to temporarily disconnect said primary file unit from said host apparatus, a disconnect request is issued from said primary file unit to said secondary file unit to temporarily disconnect said primary file unit from said secondary file unit, said factor in said primary file unit is settled, and then, in response to a reconnect request from said primary file unit, said primary file unit is reconnected to said host apparatus and said primary file unit is reconnected to and said secondary file unit; and a disconnect request is issued from said secondary file unit to said primary file unit to temporarily disconnect said secondary file unit from said primary file unit, a disconnect request is issued from said primary file unit having received said disconnect request to said host apparatus to temporarily disconnect said primary file unit from said host apparatus, said factor in said secondary file unit is settled, and then, in response to a reconnect request from said secondary file unit, said secondary file unit is reconnected to said primary file unit and said primary file unit is reconnected to said host apparatus.

5. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command, and giving, from said primary file unit to said host apparatus, notice that the writing by said write command has been normally terminated, when said primary file unit confirms that data written in said primary file unit by said write command has been normally written in said secondary file unit, wherein when a factor requiring to temporarily disconnect said primary file unit from said host apparatus appears in said primary file unit, and at the same time, a factor requiring to temporarily disconnect said secondary file unit from said primary file unit appears in said secondary file unit, while said series of write commands are processed, a disconnect request from said primary file unit to said host apparatus is issued prior to a disconnect request from said secondary file unit to said primary file unit to temporarily disconnect said primary file unit from said host apparatus, a disconnect request is issued from said primary file unit to said secondary file unit to temporarily disconnect said primary file unit from said secondary file unit;

said factor in said primary file unit and said factor in said secondary file unit are simultaneously settled; and in response to a reconnect request from said primary file unit, said primary file unit is then reconnected to said host apparatus and said primary file unit is reconnected to said secondary file unit.

6. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command, and giving, from said primary file unit to said host apparatus, notice that the writing by said write command has been normally terminated, when said primary file unit confirms that data written in said primary file unit by said write command has been normally written in said secondary file unit, wherein when, each time one of said series of write commands is accepted, a command similar to said write command is issued from said primary file unit to said secondary file unit to direct the writing, and data to be written by said write command is transferred, a command similar to said write command is issued from said primary file unit to said secondary file unit to simultaneously carry out a command accept process between said primary file unit and said secondary file unit and a data receive process of receiving data to be written by said write command from said host apparatus in said primary file unit; and said data is transferred from said primary file unit to said secondary file unit as soon as receiving said data is completed.

7. A remote transfer method used in a file system comprising a primary file unit connected to a host apparatus to be data-updated by said host apparatus, and a secondary file unit connected to said primary file unit to be data-updated by said primary file unit, said remote transfer method being a method for transferring data from said primary file unit to said secondary file unit in order to write into said secondary file unit data which is same as data written into said primary file unit by said host apparatus, when said host apparatus writes data into said primary file unit by issuing a writing operation directive command for transferring writing start location information to said primary file unit as data and successively issuing a series of write commands, which configures one write access unit together with the write operation directive command, to said primary file unit one by one, said remote transfer method comprising:

issuing a command similar to said writing operation directive command from said primary file unit to said secondary file unit, when said primary file unit receives said writing operation directive command from said host apparatus, to direct to start the writing, and then transferring said writing start location information as data; and issuing a command similar to said write command from said primary file unit to said secondary file unit, each time said primary file unit receives one of said series of write commands from said host apparatus after said writing operation directive command, to direct the writing, then transferring data to be written by said write command, and giving, from said primary file unit to said host apparatus, notice that the writing by said write command has been normally terminated, when said primary file unit confirms that data written in said primary file unit by said write command has been normally written in said secondary file unit, wherein a process of transferring, from said host apparatus to said primary file unit, data of the first write command following said writing operation directive command, and an accept process that should be completed between said primary file unit and said secondary file unit until data transfer of the first write command from said primary file unit to said secondary file unit is initiated, are carried out in parallel.

* * * * *